US012617487B2

(12) United States Patent <br> Scott-Sharoni et al.

(10) Patent No.: US 12,617,487 B2 <br> (45) Date of Patent: May 5, 2026

(54) ROUTE GUIDANCE FOR PERSONAL TRANSPORT DEVICE BASED ON PROSOCIAL BEHAVIOR COSTS

(71) Applicant: Honda Motor Co., Ltd., Tokyo (JP)

(72) Inventors: Sidney Tammie Scott-Sharoni, Atlanta, GA (US); Shashank Kumar Mehrotra, Campbell, CA (US); Miao Song, Saline, MI (US); Kevin Joel Gabriel Salubre, San Jose, CA (US); Kumar Akash, San Jose, CA (US); Teruhisa Misu, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 224 days.

(21) Appl. No.: 18/494,346

(22) Filed: Oct. 25, 2023

(65) Prior Publication Data

US 2025/0136225 A1 May 1, 2025

(51) Int. Cl.
*B62J 50/22* (2020.01)
*G01C 21/34* (2006.01)

(52) U.S. Cl.
CPC .......... *B62J 50/22* (2020.02); *G01C 21/3461* (2013.01)

(58) Field of Classification Search
CPC .............................. B62J 50/22; G01C 21/3461
See application file for complete search history.

(56) References Cited

U.S. PATENT DOCUMENTS

| | | | |
|---|---|---|---|
| 2016/0171521 A1* | 6/2016 | Ramirez | G06Q 10/04 701/409 |
| 2022/0044344 A1* | 2/2022 | Ramot | G06Q 50/40 |

FOREIGN PATENT DOCUMENTS

JP          2016042096 A * 3/2016

* cited by examiner

*Primary Examiner* — Vivek D Koppikar
*Assistant Examiner* — Jeffrey R Chalhoub
(74) *Attorney, Agent, or Firm* — Plumsea Law Group, LLC

(57) ABSTRACT

A method and system for calculating route guidance for a personal transport device based on prosocial costs is described. In one embodiment, the method includes calculating, by a processor associated with the personal transport device, a plurality of routes from a first location to a second location and determining, by the processor, one or more prosocial factors associated with each route of the plurality of routes. The method also includes calculating, by the processor, a prosocial cost associated with each route of the plurality of routes. Based on the prosocial costs, the method further includes providing, by the processor, route guidance to a user of the personal transport device from the first location to the second location along a selected route from the plurality of routes and displaying the selected route on a display associated with the personal transport device.

18 Claims, 17 Drawing Sheets

MAX SPEED = 20 MPH

MAX SPEED = 5 MPH

1400

CALCULATE ROUTES FROM A → B — 1402

DETERMINE REMAINING CHARGE — 1404

1406
PROSOCIAL ROUTE REACH DESTINATION?

YES → 1408 NO CHANGE

NO

1410
AGGRESSIVE ROUTE REACH DESTINATION?

YES → MODIFY YB THRESHOLDS — 1412

NO

NO CHANGE — 1414

SHORTEST ROUTE 1.2 MILES

PROSOCIAL ROUTE 1.5 MILES

ROUTE GUIDANCE FOR PERSONAL TRANSPORT DEVICE BASED ON PROSOCIAL BEHAVIOR COSTS

BACKGROUND

This disclosure relates generally to vehicles, and in particular to a system and method for providing route guidance for personal transport devices based on prosocial behavior costs associated with a route.

With rising prices of gasoline and automobiles, many people may turn to other more cost efficient modes of transportation such as, for example, mopeds, bicycles, scooters and, more recently, personal transport devices, including electrified and non-electrified devices, such as stand-up electric scooters or kick scooters. These personal transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network.

Various jurisdictions have different rules and regulations that apply to users of personal transport devices, including whether such personal transport devices may be used on roads or whether they must share paths, sidewalks, and trails with pedestrians and other non-roadworthy small vehicles and machines. When users of personal transport devices travel on these shared routes with pedestrians and other small vehicles, their behavior can often have negative effects on fellow users.

Prosocial behavior is a way of acting that takes into account one's actions towards others and society in general. It typically includes obeying rules and conforming to socially acceptable standards of kindness and consideration for other people.

There is a need in the art for an improved system and method for providing route guidance for personal transport devices based on prosocial behavior costs associated with a route.

SUMMARY

In one aspect, a method for calculating route guidance for a personal transport device based on prosocial costs is provided. The method includes calculating, by a processor associated with the personal transport device, a plurality of routes from a first location to a second location and determining, by the processor, one or more prosocial factors associated with each route of the plurality of routes. The method also includes calculating, by the processor, a prosocial cost associated with each route of the plurality of routes. Based on the prosocial costs, the method further includes providing, by the processor, route guidance to a user of the personal transport device from the first location to the second location along a selected route from the plurality of routes and displaying the selected route on a display associated with the personal transport device.

In another aspect, a system for calculating route guidance for a personal transport device based on prosocial costs is provided. The system includes a personal transport device having a processor and two or more wheels, a display associated with the personal transport device, and a camera associated with the personal transport device. The processor is configured to calculate a plurality of routes from a first location to a second location, determine one or more prosocial factors associated with each route of the plurality of routes, and calculate a prosocial cost associated with each route of the plurality of routes. Based on the prosocial costs, route guidance is provided to a user of the personal transport device from the first location to the second location along a selected route from the plurality of routes. The selected route is displayed on the display associated with the personal transport device.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Methods and systems for providing real-time feedback to users of personal transport devices based on prosocial behavior are described herein. The techniques of the present embodiments may be used to encourage users of personal transport devices to consider prosocial behaviors when traveling on shared routes with pedestrians and other small vehicles by defining quantifiable metrics of prosocial behavior and providing real-time feedback to users. By encouraging and making users more aware of prosocial behavior when using personal transport devices, conflicts and negative effects between users of personal transport devices and others may be reduced.

The example embodiments are described herein with reference to a personal transport device in the form of an electric scooter. As used herein, an electric scooter is a term used mainly to describe a stand-up kick scooter that is electrically powered. For example, this is a type of personal transport device that is gaining ridership in many locations. The principles of the example embodiments described herein may be applied to electric scooters or other types or form of personal transport devices, including powered devices, such as devices powered by electric motors or combustion engines, and non-powered devices, such as devices driven using a mechanical apparatus or manually propelled by users. Examples of personal transport devices include, but are not limited to, scooters, bicycles, unicycles, mopeds, skateboards, kickboards, wheelchairs, personal transporters, or the like.

The present embodiments allow for users of personal transport devices to receive real-time feedback based on prosocial behavior which may be utilized by the user and/or the personal transport device to modify speed, steering, or routing of the personal transport device. The real-time feedback of prosocial behavior derived from quantitative metrics associated with the prosocial behavior allows users and personal transport device systems to effectively improve prosocial behavior in mobility environments. As will be described herein, the features of the present embodiments utilize real-time feedback of quantitative metrics associated with prosocial behavior to provide encouragement of prosocial behavior through incentives and dynamic system responses.

Figure 1:
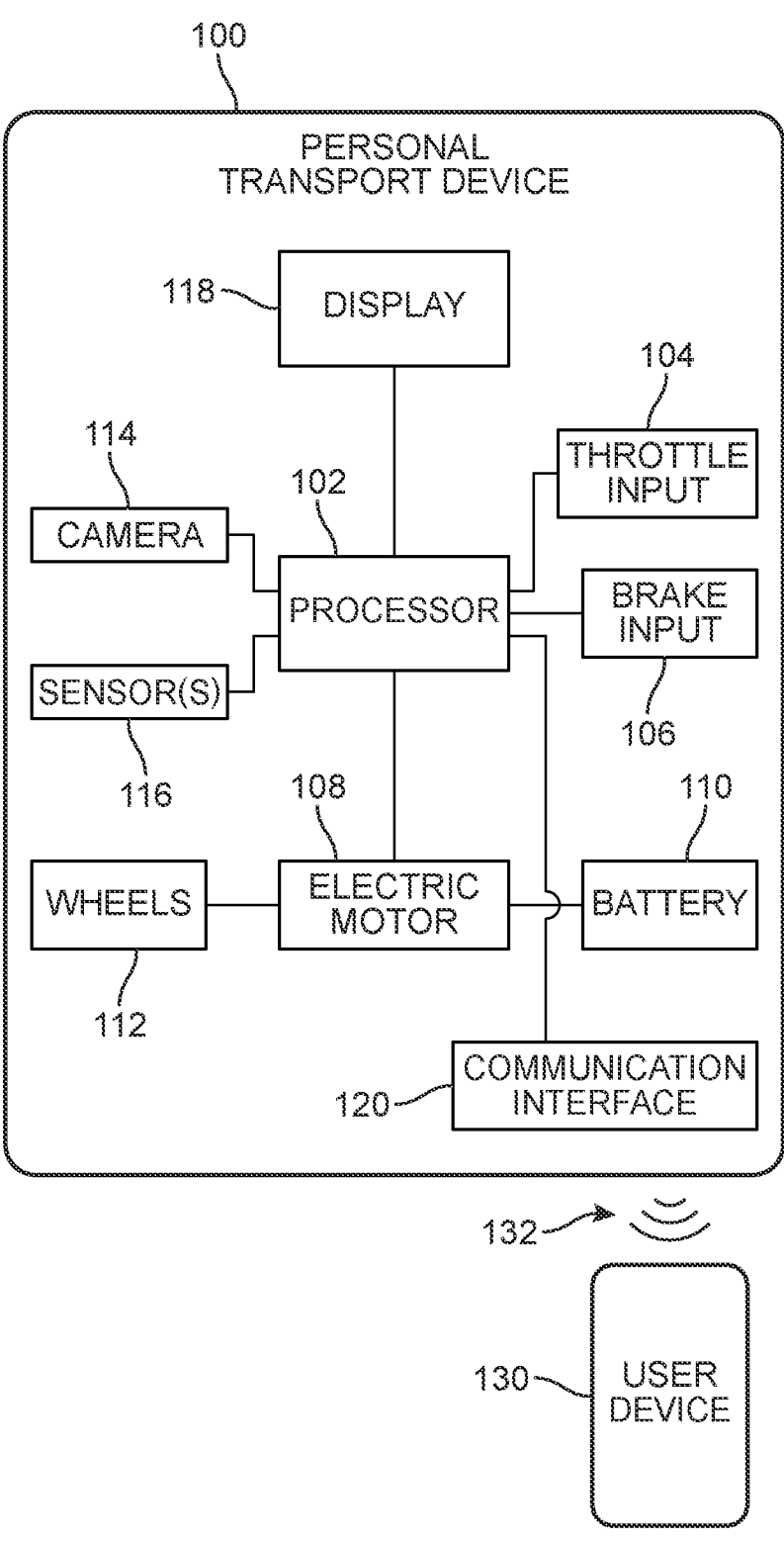
FIG. 1 is a representative view of an example embodiment of a personal transport device in accordance with aspects of the present disclosure.

Referring now to FIG. 1, a block diagram of an example embodiment of a personal transport device 100 is shown. In the exemplary embodiments described herein, personal transport device 100 may be shown in the form of an electric scooter (also referred to herein as "scooter 100"), however, it should be understood that the principles of the example embodiments may be applied to any type or form of personal transport device, as described above.

In this embodiment, personal transport device 100 includes a processor 102 that receives control inputs from a user via at least a throttle input 104 and a brake input 106. Throttle input 104 and brake input 106 are configured to provide commands to increase and decrease, respectively, a speed or acceleration of personal transport device 100.

In an example embodiment, personal transport device 100 includes an electric motor 108 that receives electric power from a battery 110 onboard personal transport device 100 to turn wheels 112 and generate a tractive force that causes personal transport device 100 to move. Electric motor 108 receives commands from throttle input 104 and brake input 106, directly or via processor 102, to increase or decrease the speed or acceleration of personal transport device 100. In one embodiment, personal transport device 100 may be a scooter having handlebars on which throttle input 104 and brake input 106 may be located. The user of personal transport device 100 may operate throttle input 104 and brake input 106 to cause personal transport device 100 to move slower or faster or to start or stop moving. In some embodiments, the handlebars may also be used by a user of personal transport device 100 to provide steering inputs to control the direction and orientation of personal transport device 100. In other embodiments, different types of steering inputs may be used.

In one embodiment, personal transport device 100 may include two wheels 112. In some cases, one or more of wheels 112 may be rotated by electric motor 108 using electric power from battery 110. For example, in the case of personal transport device 100 in the form of an electric scooter, a rear wheel may be rotated or moved by electric motor 108 and a front wheel may be unpowered. In other cases, additional electric motors substantially similar to electric motor 108 may be provided to one or more of wheels 112. For example, in the case of personal transport device 100 in the form of an electric scooter, both a rear wheel and a front wheel may be rotated or moved by electric motor 108 and/or an additional electric motor. In still other cases, personal transport device 100 may include additional or supplemental wheels that are not rotated or turned by an electric motor, including electric motor 108. In various embodiments, personal transport device 100 may have any number of wheels, including but not limited to embodiments with one wheel, two wheels, three wheels, four wheels, or any other number of wheels.

In some embodiments, personal transport device 100 may include components configured to detect and/or record parameters associated with personal transport device 100 and the environment in which personal transport device 100 is operating. In this embodiment, personal transport device 100 includes at least a camera 114 that is configured to capture images and/or video of a scene around personal transport device 100, including in front of personal transport device 100 as personal transport device 100 is moving. For example, camera 114 may capture information associated with the path or route on which personal transport device 100 is traveling, as well as capture information associated with objects, including people and/or other vehicles, located on the path in front of personal transport device 100.

In this embodiment, personal transport device 100 also includes one or more additional sensors 116. In some embodiments, sensors 116 may include sensors configured to measure parameters associated with personal transport device 100 and/or objects located on the path in front of personal transport device 100. For example, sensors 116 may include a GPS sensor that measures a location, speed, and heading of personal transport device 100. Sensors 116 may also include types of radar or lidar that measure speed and/or distance of objects located on the path in front of personal transport device 100, for example, using laser or electromagnetic waves. In various embodiments, camera 114 and/or sensors 116 may provide processor 102 of personal transport device 100 with parameters such as speed, distance, heading, and location associated with personal transport device 100 and/or objects located on the path in front of personal transport device 100. It should be understood that personal transport device 100 may include other sensors known to one or ordinary skill in the art.

In some embodiments, personal transport device 100 may include a display 118 that is configured to present information and real-time feedback of various parameters, including parameters associated with prosocial behavior as will be described below, to users of personal transport device 100. For example, display 118 may be in the form of a screen mounted on personal transport device 100 that shows the user the various information captured and/or measured by camera 114 and/or sensors 116, as well as recommendations, alerts, warnings, or other real-time feedback generated by processor 102. Display 118 may also provide information to the user of personal transport device 100 regarding, for example, battery life, status of lighting units, distance traveled, speed, routing and navigation information, hazard information and roadway infrastructure signals and readings.

In some embodiments, personal transport device 100 may further include a communication interface 120. Communication interface 120 is a module that includes circuitry and software to permit personal transport device 100 and components to communicate with a user device 130. For example, user device 130 may a mobile telephone or other mobile device owned or operated by a user of personal transport device 100. Communication between user device 130 and processor 102 of personal transport device 100 through communication interface 120 may be accomplished using a short-range wireless technology 132 that allows user device 130 to communicate with personal transport device 100. In an example embodiment, short-range wireless technology 132 may be implemented using known protocols or technologies, such as WiFi, Bluetooth®, and other types of short-range wireless or near-field communication protocols. In other embodiments, communication interface 130 may include a wired option that is directly connected to user device 130 (e.g., using a cable or dock connector).

By allowing personal transport device 100 to communicate with user device 130 via communication interface 120, one or more of camera 114, sensors 116, and display 118 may be part of personal transport device 100 (i.e., onboard), may be associated with user device 130 (e.g., using integrated cameras, sensors, etc.), or may be provided as a combination of onboard components and components from user device 130. In an exemplary embodiment, personal transport device 100 may include a dock or other apparatus for receiving user device 130, such as a mobile device or smart phone belonging to a user of personal transport device 100. With an application installed on user device 130, user device 130 may function as display 118 for personal transport device 100 and can communicate with processor 102 of personal transport device 100. The application on user device 130 may also monitor and/or control some of the operating systems of personal transport device 100. For example, information associated with braking, speed, location, heading, turn status, etc. may be monitored and/or controlled via the application on user device 130.

In some embodiments, personal transport device 100 may also include other components that are conventional for the type or form of transport device being used. In the example embodiments, personal transport device 100 is in the form of a scooter that has two wheels and is not provided with a seat. In other embodiments, however, such as where personal transport device 100 is in the form of an electric skateboard, it may have four wheels. It should be understood that the arrangement of components will vary based on the particular type and/or form of personal transport device being used.

Figure 2:
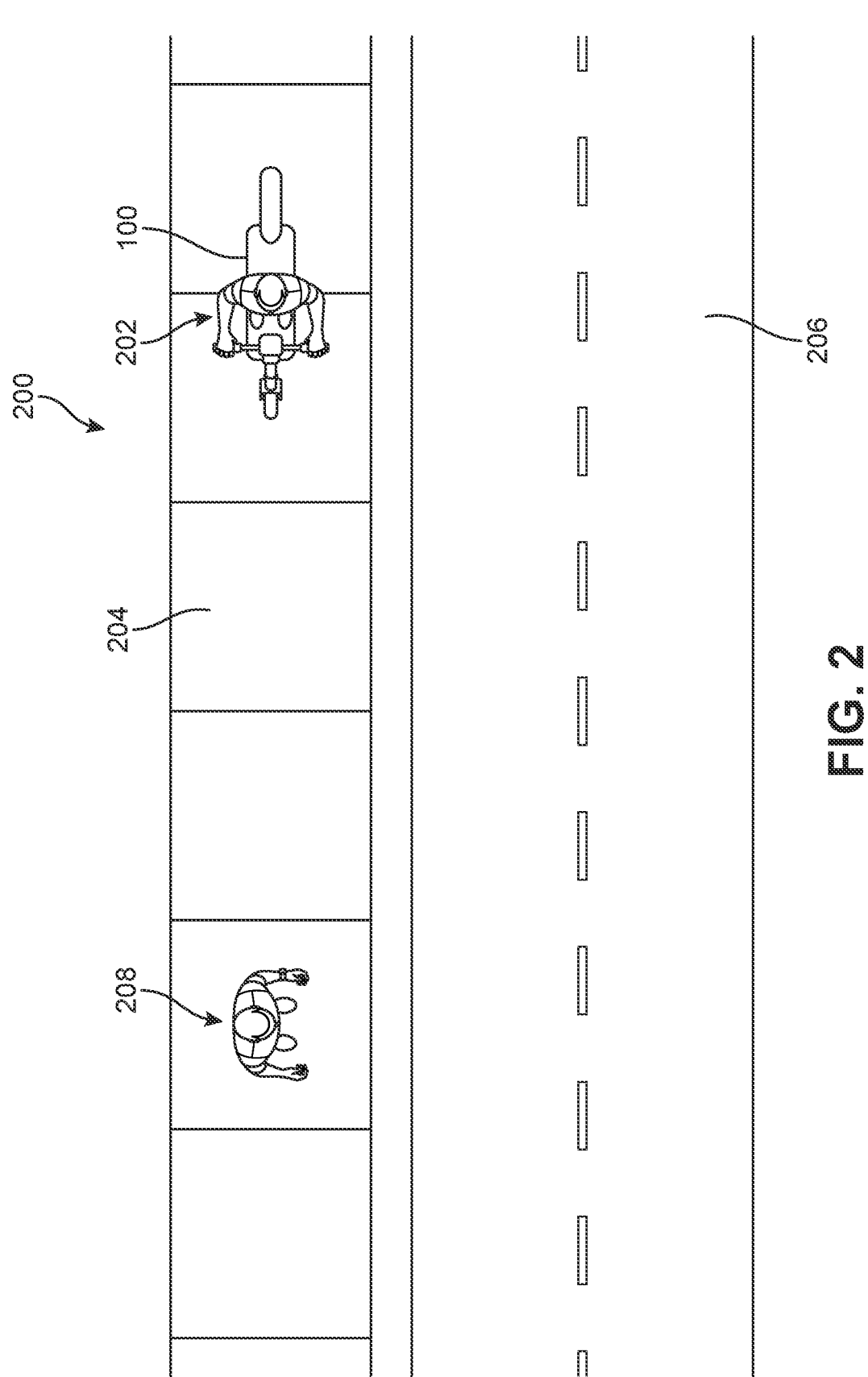
FIG. 2 is a schematic view of an example environment in which real-time feedback may be provided to users of personal transport devices based on prosocial behavior in accordance with aspects of the present disclosure.

FIG. 2 is a schematic view of an example embodiment of a mobility environment 200 in which real-time feedback may be provided to users of personal transport devices based on prosocial behavior. In this embodiment, a user 202 of a personal transport device in the form of a scooter 100 is shown traveling within mobility environment 200. As shown in FIG. 2, mobility environment 200 includes a path 204 on which scooter 100 is traveling. In one embodiment, path 204 may be a sidewalk that is disposed adjacent or near a roadway 206. That is, path 204 is intended for use by pedestrians and other vehicles that are not permitted or authorized for travel on road 206. For example, many jurisdictions have laws, regulations, or rules regarding the types of vehicles which are considered roadworthy for travel on roads, such as road 206. Path 204 is separate from road 206 and may include a sidewalk (e.g., as shown in FIG. 2), a boardwalk, a trail, a walkway, or other type of passageway that may accommodate pedestrians and small vehicles, including personal transport devices (e.g., scooter 100 shown in FIG. 2).

In an example embodiment, mobility environment 200 may also include at least one object 208 disposed on path 204 in front of a direction of travel of user 202 on scooter 100. In this embodiment, object 208 is a person who is standing or walking on path 204 (e.g., the sidewalk) in front of the direction of travel of scooter 100. According to the techniques of the present embodiments described herein, user 202 may be provided with real-time feedback regarding their prosocial behavior while riding scooter 100 in mobility environment 200 so as to be considerate of others who are also using path 204, such as object 208 in the form of a person. It should be understood that while object 208 is described as a person in this example, different types and forms of objects may be on path 204 in mobility environment 200, including, but not limited to: people, animals, powered and unpowered small vehicles (e.g., bicycles, scooters, skateboards, etc.), remote operated or autonomous robots (e.g., ground-based or flying drones, unmanned vehicles, or machines), as well as temporary or permanent stationary objects.

Figure 3:
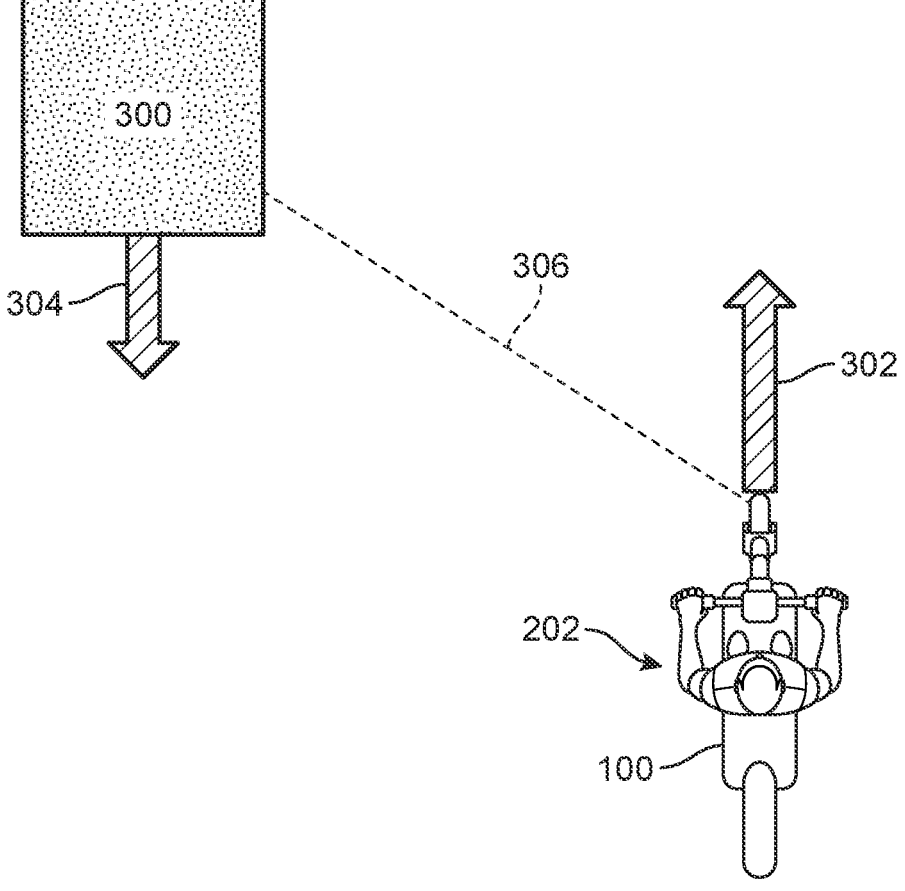
FIG. 3 is a schematic view of an example embodiment of a prosocial yielding behavior parameter associated with a personal transport device in accordance with aspects of the present disclosure.

FIG. 3 is a schematic view of an example embodiment of prosocial behavior parameters associated with personal transport device 100. In some embodiments, parameters associated with personal transport device 100 and one or more objects on the path on which personal transport device 100 is traveling may be used to calculate metrics associated with prosocial behavior of the user (e.g., user 202) riding personal transport device 100. In an example embodiment, prosocial behavior may be evaluated using a prosocial yielding behavior parameter that quantifies the acceptable or unacceptable prosocial behavior of a user of personal transport device 100 (e.g., user 202) towards others traveling on the same path, such as pedestrians, other users of personal transport devices, and/or autonomous vehicles.

In an example embodiment, a prosocial yielding behavior parameter may be calculated as a function of a speed of personal transport device 100, a speed of one or more other objects on the path on which personal transport device 100 is traveling, and a separation distance between personal transport device 100 and the other object(s). In one embodiment, the prosocial yielding behavior may be calculated as a function of these parameters according to the following relation:

$$\text{Yielding Behavior}=f(V^{other\ objects}, V^{ptd}, \text{distance})$$

As shown in FIG. 3, personal transport device 100 is being operated by user 202 on the same path (e.g., path 204 shown in FIG. 2) such that personal transport device 100 is approaching an object 300. In this embodiment, personal transport device 100 has a first speed 302 (e.g., $V^{ptd}$) in the direction of travel of personal transport device 100. Object 300 is traveling in the opposite direction as personal transport device 100 and has a second speed 304 (e.g., $V^{other\ objects}$). As personal transport device 100 and object 300 approach each other they are spaced apart by a separation distance 306 (e.g., distance).

Using the prosocial yielding behavior relation, the prosocial behavior of a user of personal transport device 100 may be compared to expected or predetermined values to determine whether a particular user of a personal transport device is traveling on the path with others in a way that is acceptable or unacceptable from a prosocial behavior standpoint.

In this embodiment, a gap between personal transport device 100 and object 300 as they approach each other is defined by separation distance 306. For example, the gap may determined according to the following equation:

$$\text{Gap}=\text{minimum}(|\text{distance}|)$$

In this example, the prosocial yielding behavior parameter of user 202 riding personal transport device 100 towards object 300 traveling on the same path may be calculated according to the following equation:

$$\text{Yielding Behavior}^{ptd}=\text{Gap}/(Vrel)^{ptd}$$

That is, the prosocial yielding behavior parameter of user 202 riding personal transport device 100 (e.g., Yielding Behavior$^{ptd}$) may be calculated by dividing separation distance 306 between personal transport device 100 and object 300 (e.g., Gap) by the relative velocity between personal transport device 100 and object 300 (e.g., (Vrel)$^{ptd}$). In the example shown in FIG. 3, the relative velocity between personal transport device 100 and object 300 is the sum of first speed 302 associated with personal transport device 100 and second speed 304 of object 300. For example, if first speed 302 of personal transport device 100 is 15 mph and second speed 304 of object 300 is 5 mph, then the relative velocity between them is 20 mph. If separation distance 306 is approximately 10 feet, then the prosocial yielding behavior parameter in this example would be 0.5 (i.e., 10 feet divided by 20 mph).

In the example shown in FIG. 3, personal transport device 100 and object 300 are shown traveling in opposite directions so that the relative velocity between them is the sum of each of their speeds (e.g., first speed 302 and second speed 304). In other cases where personal transport device 100 and other objects are traveling in the same direction, then the relative velocity between them would be the difference between each of their respective speeds.

Generally, a higher prosocial yielding behavior parameter is indicative of better or positive (i.e., more acceptable) prosocial behavior and a lower prosocial yielding behavior parameter is indicative or worse or negative (i.e., less acceptable) prosocial behavior. As can be seen from the prosocial yielding behavior parameter equation above, a user's prosocial yielding behavior parameter may be increased by maintaining a larger separation distance (e.g., increasing separation distance 306) from objects, by slowing down so that the relative velocity between the user and the object is smaller (e.g., reducing first speed 302), or by doing both (e.g., increasing separation distance 306 and reducing first speed 302). For example, if first speed 302 of personal transport device 100 is reduced to 10 mph and second speed 304 of object 300 remains 5 mph, then the relative velocity between them is 15 mph, resulting in a prosocial yielding behavior parameter of 0.67 while maintaining the 10 ft separation distance 306. If the relative velocity between personal transport device 100 and object 300 remains at 20 mph, but separation distance 306 is increased to approximately 15 feet, then the prosocial yielding behavior parameter would be 0.75. Finally, if both the relative velocity is reduced to 15 mph and separation distance 306 is increased to 15 ft, the prosocial yielding behavior parameter would be 1.0. In each case, the resulting prosocial yielding behavior parameter is improved (e.g., increased) over the original example of 0.5.

It should be understood that other parameters and factors may also be used in determining or calculating prosocial behavior metrics, including prosocial yielding behavior parameters. For example, an object's heading, an object's size (e.g., height, width, length, and/or weight), a type of object (e.g., person, animal, or autonomous vehicle), or other parameters or factors may be used to determine prosocial behavior.

The techniques of the present embodiments provide incentives and dynamic system responses that encourage and assist a user of a personal transport device to engage in positive prosocial behaviors. With this arrangement, conflicts and negative effects between users of personal transport devices and others traveling on the same paths may be reduced.

In some embodiments, the calculated prosocial yielding behavior parameters may be classified according to criteria that determines whether a particular prosocial yielding behavior parameter is acceptable (e.g., indicative of positive prosocial behavior) or is not acceptable (e.g., indicative of negative prosocial behavior). In other embodiments, prosocial behaviors may be classified using a range of criteria with varying gradations between positive prosocial behavior and negative prosocial behavior. The number of classifications for the prosocial yielding behavior parameters shown in the example embodiments is exemplary and other numbers of classifications for the calculated prosocial yielding behavior parameters may be used.

Figure 4C:
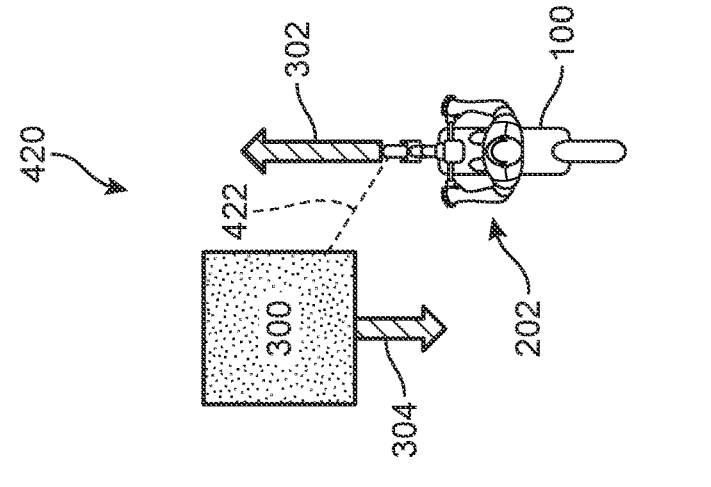
FIG. 4C is a representative view of an example embodiment of a third prosocial yielding behavior associated with a personal transport device in accordance with aspects of the present disclosure.
Figure 4B:
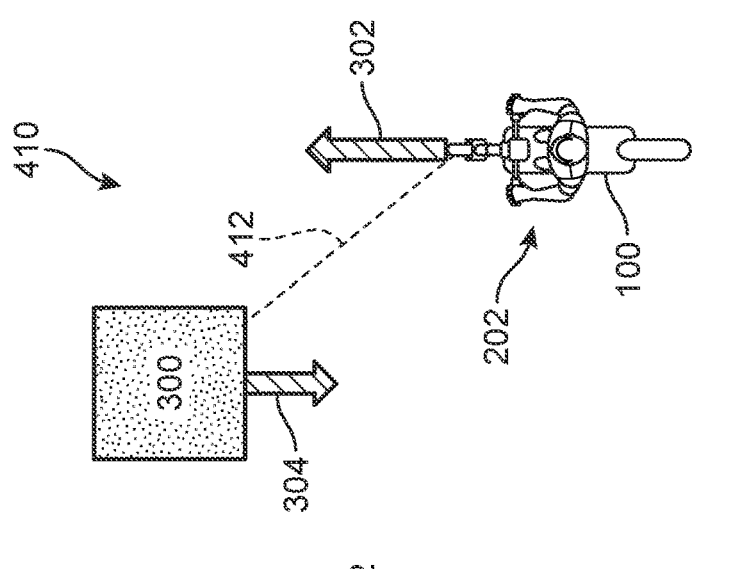
FIG. 4B is a representative view of an example embodiment of a second prosocial yielding behavior associated with a personal transport device in accordance with aspects of the present disclosure.
Figure 4A:
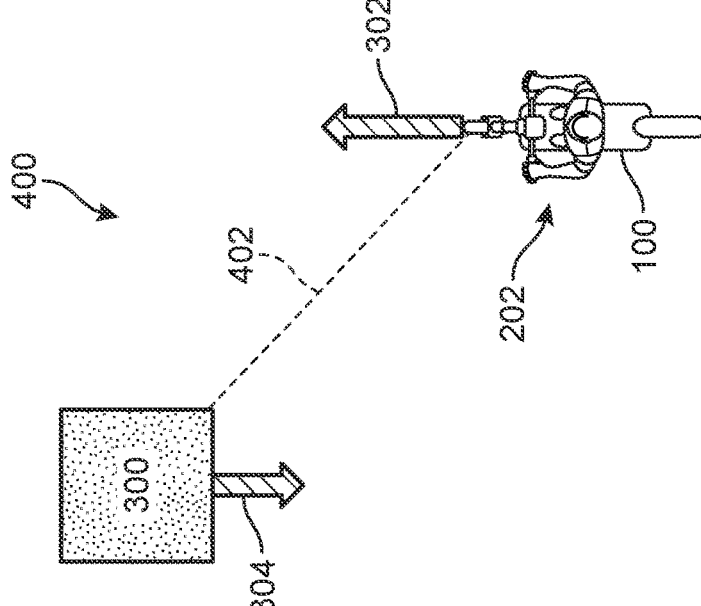
FIG. 4A is a representative view of an example embodiment of a first prosocial yielding behavior associated with a personal transport device in accordance with aspects of the present disclosure.

Referring now to FIG. 4A, a representative view of an example embodiment of a first prosocial yielding behavior 400 associated with personal transport device 100 is shown. In this embodiment, personal transport device 100 is operated by user 202 on the same path (e.g., path 204 shown in FIG. 2) as object 300, as shown in FIG. 3. Personal transport device 100 is associated with first speed 302 and object 300 is associated with second speed 304, as also described above. In this embodiment, separation distance 402 between personal transport device 100 and object 300 is large such that the calculated prosocial yielding behavior parameter is high. That is, first prosocial yielding behavior 400 may be considered generally positive.

Referring now to FIG. 4B, a representative view of an example embodiment of a second prosocial yielding behavior 410 associated with personal transport device 100 is shown. In this embodiment, personal transport device 100 is operated by user 202 on the same path (e.g., path 204 shown in FIG. 2) as object 300, as shown in FIG. 3. Personal transport device 100 is associated with first speed 302 and object 300 is associated with second speed 304, as also described above. In this embodiment, separation distance 412 between personal transport device 100 and object 300 is smaller than separation distance 402 as shown in FIG. 4A such that the calculated prosocial yielding behavior parameter is lower than the calculated prosocial yielding behavior parameter associated with first prosocial yielding behavior 400 shown in FIG. 4A. That is, second prosocial yielding behavior 410 may be considered acceptable, but is indicative of a less positive prosocial behavior than first prosocial yielding behavior 400.

Referring now to FIG. 4C, a representative view of an example embodiment of a third prosocial yielding behavior 420 associated with personal transport device 100 is shown. In this embodiment, personal transport device 100 is operated by user 202 on the same path (e.g., path 204 shown in FIG. 2) as object 300, as shown in FIG. 3. Personal transport device 100 is associated with first speed 302 and object 300 is associated with second speed 304, as also described above. In this embodiment, separation distance 422 between personal transport device 100 and object 300 is much smaller than separation distance 402 shown in FIG. 4A and separation distance 412 as shown in FIG. 4B. Accordingly, the calculated prosocial yielding behavior parameter for third prosocial yielding behavior 420 is lower than both the calculated prosocial yielding behavior parameter associated with first prosocial yielding behavior 400 shown in FIG. 4A and the calculated prosocial yielding behavior parameter associated with second prosocial yielding behavior 410 shown in FIG. 4B. That is, third prosocial yielding behavior 420 may be considered not acceptable and indicative of a negative prosocial behavior. In this case, separation distance 422 is too close to object 300 so as to cause discomfort or unease to another person or, in the case of an autonomous vehicle, to trigger or cause an accident avoidance response or reaction.

In the examples of FIGS. 4A-4C, a range of prosocial behavior criteria associated with varying degrees of prosocial yielding behaviors are shown (i.e., positive, acceptable, and negative) based on the calculated prosocial yielding behavior parameter. In these examples, the separation distances (e.g., 402, 412, 422) were varied to change the calculated prosocial yielding behavior parameter from a high value (e.g., associated with first prosocial yielding behavior 400) to a middle value (e.g., associated with second prosocial yielding behavior 410) and to a low value (e.g., associated with third prosocial yielding behavior 420). As described above, the changes in prosocial yielding behavior parameter may also be affected by varying the relative velocity between personal transport device 100 and object 300 (e.g., where reducing the user's speed causes the prosocial yielding behavior parameter to increase) or by both increasing separation distance and reducing the relative velocity.

In some embodiments, a user of a personal transport device may be provided real-time feedback of their prosocial yielding behavior so that the user may voluntarily improve their prosocial behavior, for example, by increasing a separation distance and/or reducing their speed. In various embodiments, real-time feedback may take a number of different forms or formats.

Figure 5C:
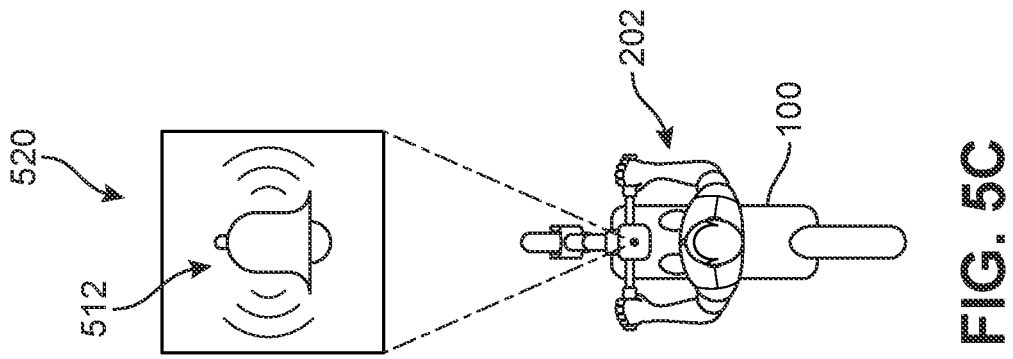
FIG. 5C is a representative view of a third type of real-time feedback provided to a user of a personal transport device based on prosocial behavior in accordance with aspects of the present disclosure.
Figure 5B:
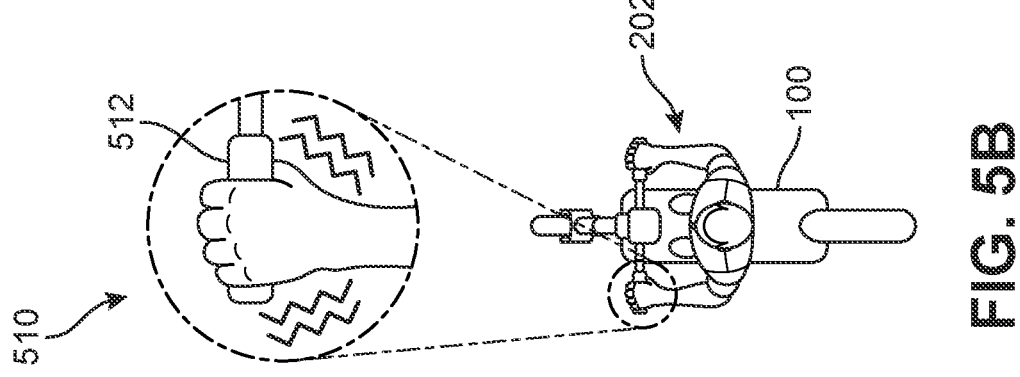
FIG. 5B is a representative view of a second type of real-time feedback provided to a user of a personal transport device based on prosocial behavior in accordance with aspects of the present disclosure.
Figure 5A:
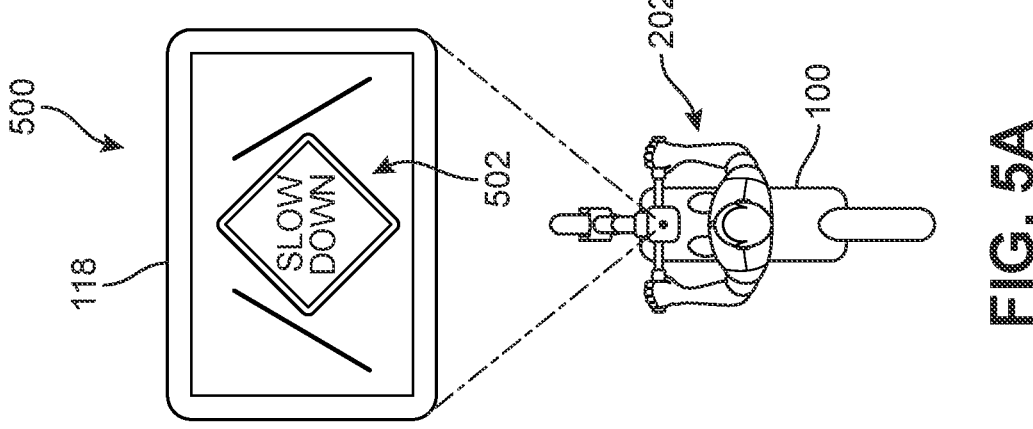
FIG. 5A is a representative view of a first type of real-time feedback provided to a user of a personal transport device based on prosocial behavior in accordance with aspects of the present disclosure.

Referring now to FIG. 5A, a representative view of a first type of real-time feedback provided to a user of a personal transport device based on prosocial behavior is shown. In this embodiment, visual real-time feedback 500 is provided to user 202 on personal transport device 100 through display 118. As shown in FIG. 5A, visual real-time feedback 500 may take the form of a message 502 or other graphical alert or warning shown on display 118 of personal transport device 100 or on a display screen of user device 130. For example, visual real-time feedback 500 may be provided to user 202 based on a calculated prosocial yielding behavior parameter that indicates unacceptable prosocial behavior, as described above. With this arrangement, visual real-time feedback 500 may assist user 202 in being aware of their prosocial behavior so that they can increase a separation distance and/or reduce their speed as they approach another object.

Referring now to FIG. 5B, a representative view of a second type of real-time feedback provided to user 202 of personal transport device 100 based on prosocial behavior is shown. In this embodiment, haptic real-time feedback 510 is provided to user 202 on personal transport device 100 through handlebars 512 of personal transport device 100. As shown in FIG. 5B, haptic real-time feedback 510 may take the form of a vibrating or shaking handlebar 512 of personal transport device 100 that can be felt by a hand of user 202. For example, haptic real-time feedback 510 may be provided to user 202 based on a calculated prosocial yielding behavior parameter that indicates unacceptable prosocial behavior, as described above. With this arrangement, haptic real-time feedback 510 may assist user 202 in being aware of their prosocial behavior so that they can increase a separation distance and/or reduce their speed as they approach another object.

Referring now to FIG. 5C, a representative view of a third type of real-time feedback provided to user 202 of personal transport device 100 based on prosocial behavior is shown. In this embodiment, audio real-time feedback 520 is provided to user 202 on personal transport device 100 through a speaker on personal transport device 100 or user device 130. As shown in FIG. 5C, audio real-time feedback 520 may take the form of an audio alert 522 or sound generated by personal transport device 100 or user device 130. For example, audio real-time feedback 520 may be provided to user 202 based on a calculated prosocial yielding behavior parameter that indicates unacceptable prosocial behavior, as described above. With this arrangement, audio real-time feedback 520 may assist user 202 in being aware of their prosocial behavior so that they can increase a separation distance and/or reduce their speed as they approach another object.

In some embodiments, algorithms utilizing machine learning or artificial intelligence (AI) techniques may be used to determine a particular type or combination of types of real-time feedback to provide to a user based on their preferences and/or responsiveness to specific feedback types. In an example embodiment, a processor, including processor 102 onboard personal transport device 100 and/or a processor associated with user device 130 (e.g., a smart phone), may provide one or more types of real-time feedback (i.e., 500, 510, 520) to a user of personal transport device 100 based on prosocial behavior parameters. Based on the user's responsiveness to a specific type of feedback, the algorithms utilizing machine learning or AI techniques may determine that one type of feedback is more effective at changing the prosocial yielding behavior parameter of the user (i.e., increases the prosocial yielding behavior parameter). In response, the algorithm may automatically implement real-time feedback using the most effective type of feedback for the particular user in order to assist with increasing the user's prosocial yielding behavior parameter, thereby causing the user's prosocial behavior to become more acceptable to others.

In other embodiments, algorithms utilizing machine learning or AI techniques may also be used to determine an amount or strength of the real-time feedback that is effective for a particular user. For example, the algorithms utilizing machine learning or AI techniques may automatically increase the brightness and/or size of visual real-time feedback 500 shown on display 118, may automatically increase the strength and/or duration of haptic real-time feedback 510 provided through handlebars 512, and/or may automatically increase the volume and/or change the sound of audio real-time feedback 520 to determine when a particular type of feedback is more effective at changing the prosocial yielding behavior parameter of the user (i.e., increases the prosocial yielding behavior parameter). Additionally, in some embodiments, the algorithms utilizing machine learning or AI techniques may determine a specific combination of two or more types of real-time feedback (500, 510, 520) are more effective at changing the prosocial yielding behavior parameter of the user. Based on the determination by the algorithms utilizing machine learning or AI techniques, the default settings for personal transport device 100 may be changed to use the real-time feedback types or combinations found to be the most effective at altering the user's prosocial behavior.

In some embodiments, personal transport device 100 may initiate dynamic speed governing in response to a calculated prosocial yielding behavior parameter that is not considered acceptable in order to increase the prosocial yielding behavior parameter to an acceptable value. For example, in the case of third prosocial yielding behavior 420 shown in FIG. 4C, personal transport device 100, via processor 102 and/or a processor of user device 130, may automatically reduce the speed of personal transport device 100 to thereby increase the calculated prosocial yielding behavior parameter as a user of personal transport device 100 approaches an object traveling on the same path as personal transport device 100. As described above, the reduction in relative velocity between personal transport device 100 and the object causes the prosocial yielding behavior parameter to increase from a lower value to a higher value. In this manner, an unacceptable prosocial yielding behavior, such as third prosocial yielding behavior 420 shown in FIG. 4C, may be controlled to an acceptable prosocial yielding behavior, such as either first prosocial yielding behavior 400 shown in FIG. 4A or second prosocial yielding behavior 410 shown in FIG. 4B.

Figure 6:
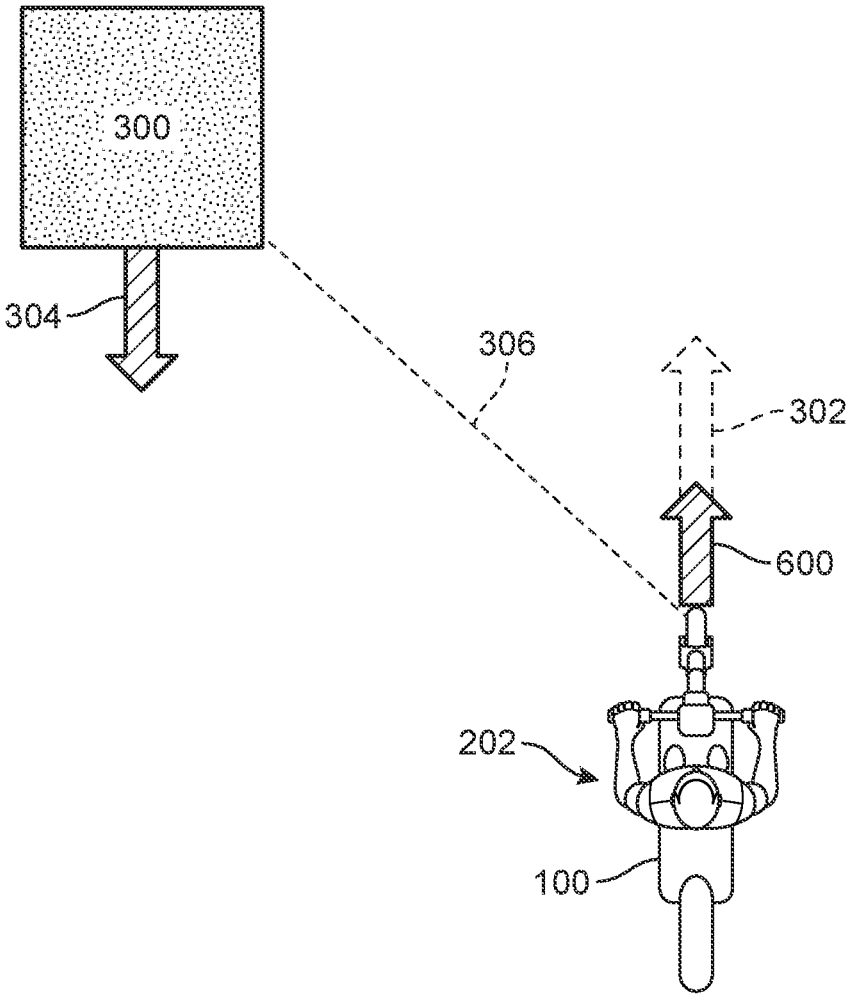
FIG. 6 is a representative view of an example embodiment of dynamic speed governing of personal transport device based on prosocial behavior in accordance with aspects of the present disclosure.

Referring now to FIG. 6, a representative view of an example embodiment of dynamic speed governing of personal transport device 100 based on prosocial behavior is shown. In this embodiment, user 202 of personal transport device 100 is traveling on the same path as object 300 and as personal transport device 100 and object 300 approach each other, they are spaced apart by separation distance 306. Object 300 is associated with second speed 304, as described above. In this embodiment, personal transport device 100 initiates dynamic speed governing in response to a calculated prosocial yielding behavior parameter that is not considered acceptable in order to increase the prosocial yielding behavior parameter to an acceptable value. In this case, personal transport device 100, via processor 102 and/or a processor of user device 130, controls electric motor 108 (shown in FIG. 1) to reduce the speed of personal transport device 100 from first speed 302 (shown in outline) to a third speed 600.

With this arrangement, the reduction in the speed of personal transport device 100 from first speed 302 to third speed 600 increases the calculated prosocial yielding behavior parameter from an unacceptable value (e.g., lower than a predetermined threshold value) to an acceptable value (e.g., greater than the predetermined threshold value). By automatically initiating dynamic speed reduction of personal transport device 100 from first speed 302 to third speed 600 in response to real-time feedback of prosocial behavior parameters, the calculated prosocial yielding behavior parameter may be increased so as to enforce or encourage prosocial behavior by user 202 of personal transport device 100.

Additionally, in some embodiments, steering response of personal transport device 100 may also be dynamically controlled to adjust the prosocial yielding behavior of a user of personal transport device 100. For example, as described above, the calculated prosocial yielding behavior parameter may be increased not only by reducing speed, but also by increasing the separation distance between personal transport device 100 and an object. Thus, personal transport device 100, via processor 102 and/or a processor of user device 130, may automatically control the steering operation of personal transport device 100 so as to increase the separation distance between personal transport device 100 and an object when the calculated prosocial yielding behavior parameter is low and associated with an unacceptable prosocial yielding behavior. With this arrangement, acceptable prosocial behavior may be automatically implemented by personal transport device 100 in response to real-time feedback of prosocial behavior parameters.

Figure 7A:
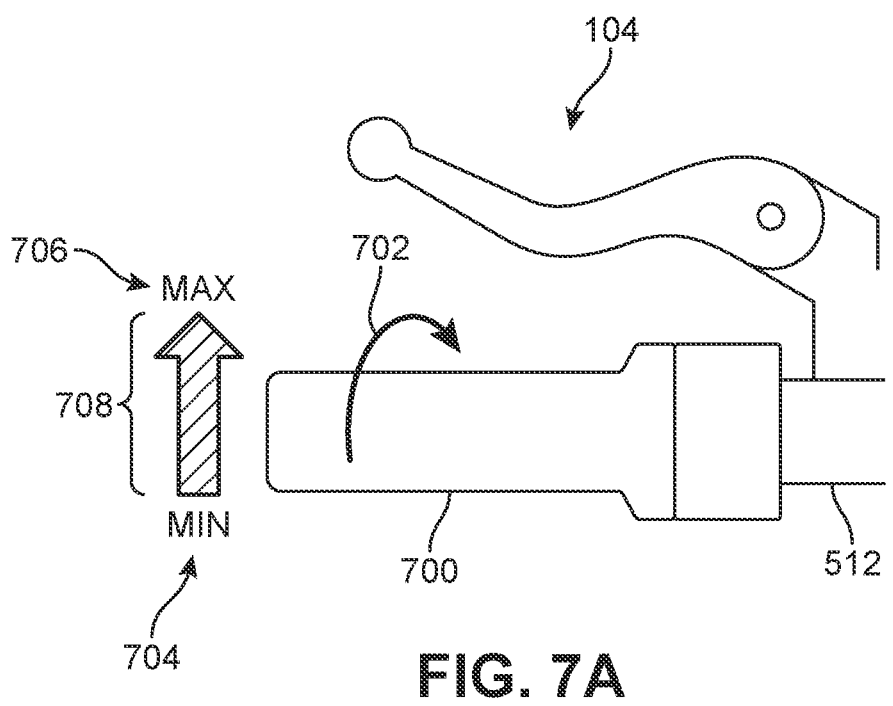
FIG. 7A is a first representative view of an example embodiment of dynamic input governing of personal transport device based on prosocial behavior in accordance with aspects of the present disclosure.
Figure 7B:
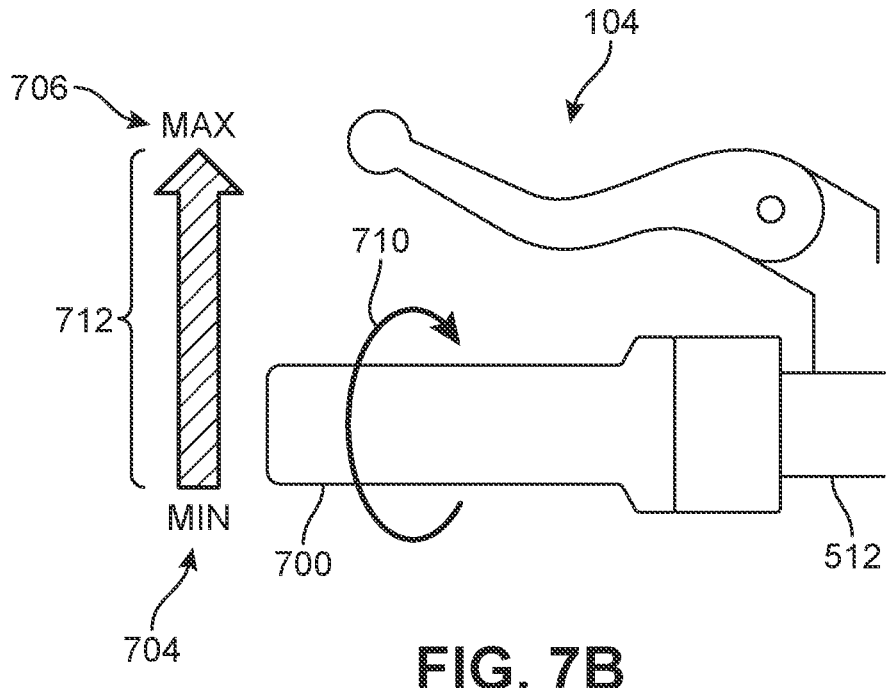
FIG. 7B is a second representative view of the example embodiment of dynamic input governing of personal transport device based on prosocial behavior in accordance with aspects of the present disclosure.

In some embodiments, a process for dynamic input governing may be implemented based on prosocial behavior parameters to alter or change throttle input 104 (shown in FIG. 1) to encourage or assist a user to engage in acceptable prosocial behavior. Referring now to FIGS. 7A and 7B, two different ranges for throttle input 104 of personal transport device 100 are shown based on real-time feedback of prosocial behavior parameters. FIG. 7A is a first representative view of an example embodiment of dynamic input governing of personal transport device 100 based on prosocial behavior. In this embodiment, throttle input 104 may be controlled by a user (e.g., user 202) using a rotating grip 700 on handlebars 512 of personal transport device 100. Turning rotating grip 700 by a first rotational amount 702 causes a speed of personal transport device 100 to be controlled from a minimum 704 to a maximum 706. That is, turning grip 700 by first rotational amount 702 causes the speed of personal transport device 100 to progress through a first range 708 associated with a first scale between minimum 704 and maximum 706.

In this embodiment, first rotational amount 702 may be approximately 180 degrees so that a half turn of rotating grip 700 on handlebars 512 of personal transport device 100 can progress through the entirety of first range 708 from minimum 704 to maximum 706. In an example embodiment, the first scale of first range 708 associated with first rotational amount 702 may be a default setting for throttle input 104 of personal transport device 100. Based on the calculated prosocial yielding behavior parameter for personal transport device 100, this default setting may be maintained as long as a user of personal transport device 100 has an acceptable value for the calculated prosocial yielding behavior parameter (e.g., greater than a predetermined threshold value).

In contrast, when the calculated prosocial yielding behavior parameter is not acceptable, personal transport device 100 may automatically implement dynamic input governing to alter or change throttle input 104. FIG. 7B is a second representative view of the example embodiment of dynamic input governing of personal transport device 100 based on prosocial behavior. In this embodiment, in response to a calculated prosocial yielding behavior that is not acceptable (e.g., lower than a threshold value), throttle input 104 is changed so that turning rotating grip 700 by a second rotational amount 710 causes a speed of personal transport device 100 to be controlled from minimum 704 to maximum 706. That is, turning grip 700 by second rotational amount 710 causes the speed of personal transport device 100 to progress through a second range 712 associated with a second scale between minimum 704 and maximum 706.

In this embodiment, second range 712 associated with the second scale is larger than first range 708 associated with the first scale so that rotating grip 700 must be turned or rotated to a larger degree or amount to increase the speed of personal transport device. In this embodiment, second rotational amount 710 may be approximately 360 degrees so that a full turn of rotating grip 700 on handlebars 512 of personal transport device 100 progresses through the entirety of second range 712 from minimum 704 to maximum 706. Thus, the dynamic input governing implemented by personal transport device 100 causes throttle input 104 to be changed from first scale 708 to second scale 712 so that rotating grip 700 needs to be turned more to change the speed of personal transport device 100. With this arrangement, requiring more effort by the user to increase the speed of personal transport device 100 may help increase or improve the prosocial behavior of the user operating personal transport device 100.

Figures 8A, 8B:
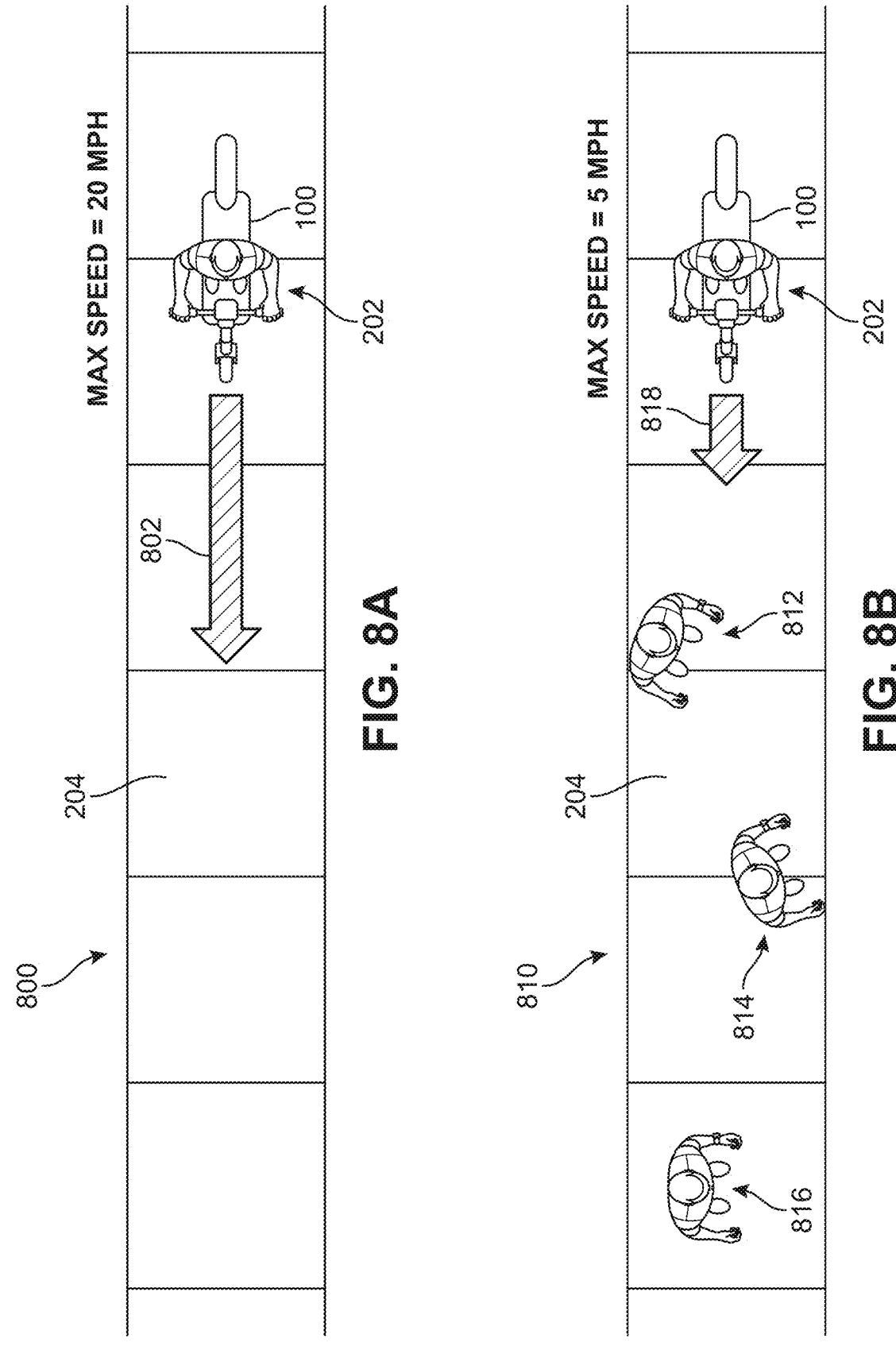
FIG. 8A is a representative view of an example embodiment of a personal transport device being operated in a first environment in accordance with aspects of the present disclosure.
FIG. 8B is a representative view of an example embodiment of a personal transport device being operated in a second environment in accordance with aspects of the present disclosure.

In other embodiments, dynamic speed governing implemented by personal transport device 100 may be based on a mobility environment in which personal transport device 100 is traveling to encourage or enforce prosocial behavior. Referring now to FIG. 8A, a representative view of personal transport device 100 being operated in a first environment 800 is shown. First environment 800 in this example is path 204 on which user 202 of personal transport device 100 is traveling. In this embodiment, first environment 800 is free from other objects, such as people or other vehicles, that are sharing path 204 with personal transport device 100. As a result, while traveling on path 204 within first environment 800, personal transport device 100 may be permitted to have a first maximum speed 802. For example, in this case, first maximum speed may be approximately 20 mph. Because first environment 800 is relatively empty or free of other objects, personal transport device 100 may permit user 202 to operate personal transport device 100 with first maximum speed 802 without concern for prosocial behavior.

In some embodiments, personal transport device 100 may determine the appropriateness of first maximum speed 802 in first environment 800 by using images and/or video captured from camera 114 onboard personal transport device 100 or a camera associated with user device 130. Image or object recognition algorithms may be used to process the captured images or video from the camera to determine the presence or absence of other objects within first environment 800 in order to allow personal transport device 100 to have first maximum speed 802.

In other embodiments, when one or more other objects are detected by camera 114 or the camera of user device 130, personal transport device 100 may automatically implement dynamic speed governing based on the surrounding environment in which personal transport device 100 is traveling. Referring now to FIG. 8B, personal transport device 100 is shown being operated by user 202 in a second environment 810. Second environment 810, in this example, includes a number of other objects that are also located on the same path 204 on which user 202 of personal transport device 100 is traveling. In this embodiment, second environment 810 includes at least a first person 812, a second person 814, and a third person 816 that are sharing path 204 with personal transport device 100. As a result, while traveling on path 204 within second environment 810, personal transport device 100 may be permitted only to have a second maximum speed 818, which is lower than first maximum speed 802 permitted in first environment 800. For example, in this case, second maximum speed may be approximately 5 mph. Because second environment 810 is relatively crowded and includes a number of other objects, including people (812, 814, 816), personal transport device 100 may permit user 202 to operate personal transport device 100 with second maximum speed 818 that is configured to encourage prosocial behavior.

Figure 9:
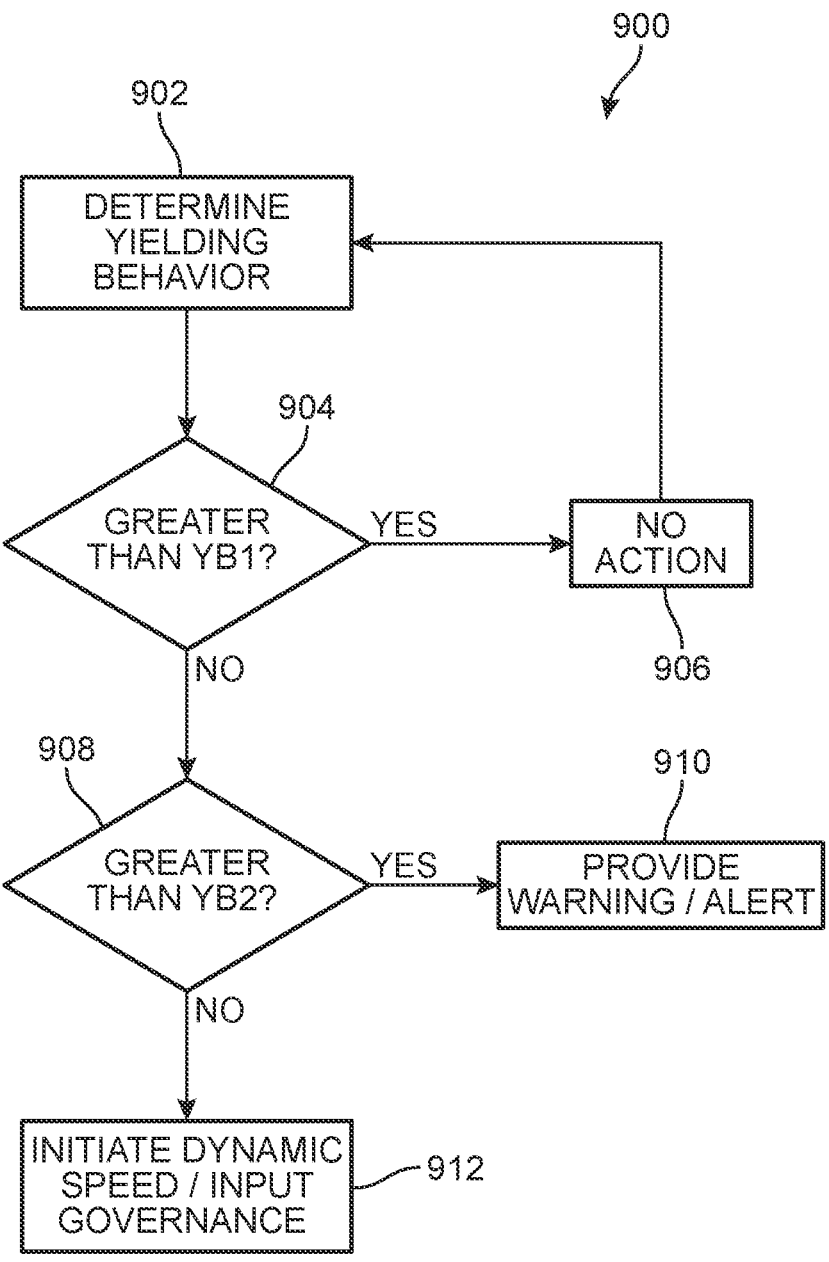
FIG. 9 is a flowchart of an exemplary method for providing real-time feedback to users of personal transport devices based on prosocial behavior in accordance with aspects of the present disclosure.

FIG. 9 is a flowchart of an exemplary method 900 for providing real-time feedback to users of personal transport devices based on prosocial behavior. In some embodiments, operations of method 900 may be implemented by processor 102 of personal transport device 100, a processor of user device 130, or by a combination of both. In an example embodiment, method 900 may be begin at an operation 902. In an example embodiment, operation 902 of method 900 may begin upon detection of an object in the path of personal transport device 100. At operation 902, a prosocial yielding behavior parameter of personal transport device 100 is calculated. For example, at operation 902, the calculated prosocial yielding behavior parameter may be calculated using the parameters described above, for example, based on information received from one or more cameras and sensors of personal transport device 100 and/or user device 130 (as shown in FIG. 1).

Next, method 900 may proceed to an operation 904. At operation 904, the calculated prosocial yielding behavior parameter from operation 902 may be compared with a first predetermined threshold value for the yielding behavior (i.e., YB1). When the result of the comparison at operation 904 is that the calculated prosocial yielding behavior parameter is greater than the first predetermined threshold value YB1 (i.e., the result is YES), then method 900 proceeds to an operation 906 where no action is performed. Method 900 may return to the beginning where a new prosocial yielding behavior is calculated upon detection of a new object in the path of personal transport device 100. That is, at operation 904, it is determined that the calculated prosocial yielding behavior parameter from operation 902 indicates that the prosocial behavior of the user of personal transport device is positive (i.e., above YB1) and no action is necessary to encourage or enforce prosocial behavior.

When the result of the comparison at operation 904 is that the calculated prosocial yielding behavior parameter is not greater than the first predetermined threshold value YB1 (i.e., the result is NO), then method 900 proceeds to an operation 908. At operation 908, whether the calculated prosocial yielding behavior parameter is greater than a second predetermined threshold value for the yielding behavior (i.e., YB2) is determined. In an example embodiment, second predetermined threshold value YB2 is smaller than first predetermined threshold value YB1. For example, first predetermined threshold value YB1 may be associated with a positive prosocial behavior, such as first prosocial yielding behavior 400 shown in FIG. 4A and second predetermined threshold value YB2 may be associated with an acceptable prosocial behavior, such as second prosocial yielding behavior 410 shown in FIG. 4B.

When the result of the comparison at operation 908 is that the calculated prosocial yielding behavior parameter is greater than the second predetermined threshold value YB2 (i.e., the result is YES), then method 900 proceeds to an operation 910 where a warning or alert is provided to a user of personal transport device 100. For example, the warning or alert provided at operation 910 may be any one or more of the alert types described above in reference to FIGS. 5A, 5B, 5C above. Additionally, as described above, machine learning and/or AI techniques may be implemented to determine a most effective type and/or strength or duration of warnings or alerts to be provided at operation 910, including combinations of two or more different types of warnings or alerts.

When the result of the comparison at operation 908 is that the calculated prosocial yielding behavior parameter is not greater than the second predetermined threshold value YB2 (i.e., the result is NO), then method 900 proceeds to an operation 912. That is, the result of operation 908 indicates that a user of personal transport device 100 is engaging in prosocial behavior that is not acceptable, such as third prosocial yielding behavior 420 shown in FIG. 4C. As a result of the determination, operation 912 of method 900 may initiate dynamic speed or input governance in order to reduce the speed of personal transport device 100 and cause the prosocial yielding behavior parameter to increase to an acceptable value. The dynamic speed or input governance initiated at operation 912 may include dynamic speed governance or dynamic input governance, as described above, and in some cases may further include dynamic steering control. With this arrangement, method 900 may be configured to encourage or enforce prosocial behavior of a user of a personal transport device.

In some embodiments, a user of personal transport device 100 (e.g., user 202) may be provided with a report or summary of their prosocial behavior after finishing a trip or ride on personal transport device 100. The report or summary may include an overall score of the user's total prosocial behavior while using personal transport device 100. For example, the report or summary may include each interaction between the user of personal transport device 100 and other objects, such as pedestrians, autonomous vehicles, other personal transport devices, or other objects, encountered by the user on a ride or trip. The report or summary may also include the user's calculated prosocial yielding behavior parameter for each encounter, as well as an indication of whether that prosocial yielding behavior parameter is indicative of positive, acceptable, or negative prosocial behavior. The total overall score may be an average of each of the interactions.

Additionally, in some case, the report or summary may include tips or suggestions to a user of personal transport device 100 about how to improve their prosocial behavior. For example, the report or summary may suggest slowing down and/or increasing separation distances between personal transport device 100 and other objects. In some embodiments, the report or summary may be provided to the user on display 118 of personal transport device 100 and/or on user device 130. In other embodiments, the report or summary may be provided to the user's email or via other delivery methods. With this arrangement, a user of personal transport device 100 may use the report or summary to improve their prosocial behavior towards others.

In some embodiments, personal transport device 100 may be provided with a battery (e.g., onboard battery 110, shown in FIG. 1) to power an electric motor (e.g., electric motor 108) that is configured with a predetermined range. In practice, an actual range of a personal transport device may deviate from the predetermined range based on a number of factors, such as terrain, temperature, weight of a user, operating parameters, etc. In an example embodiment, a personal transport device (e.g., personal transport device 100) may be provided with a battery (e.g., battery 110) that includes a power reserve that is configured to provide a user of the personal transport device with additional electric power so as to provide supplemental range to the personal transport device. In some embodiments, an amount of access to the battery's power reserve may be conditioned or based on a user's prosocial behavior when riding the personal transport device. With this arrangement, a user who demonstrates positive or acceptable prosocial behavior (e.g., based on the calculated prosocial yielding behavior parameter, described above) may be provided with a reward or incentive in the form of additional power from a battery power reserve to extend or supplement the range of a personal transport device.

Figure 10:
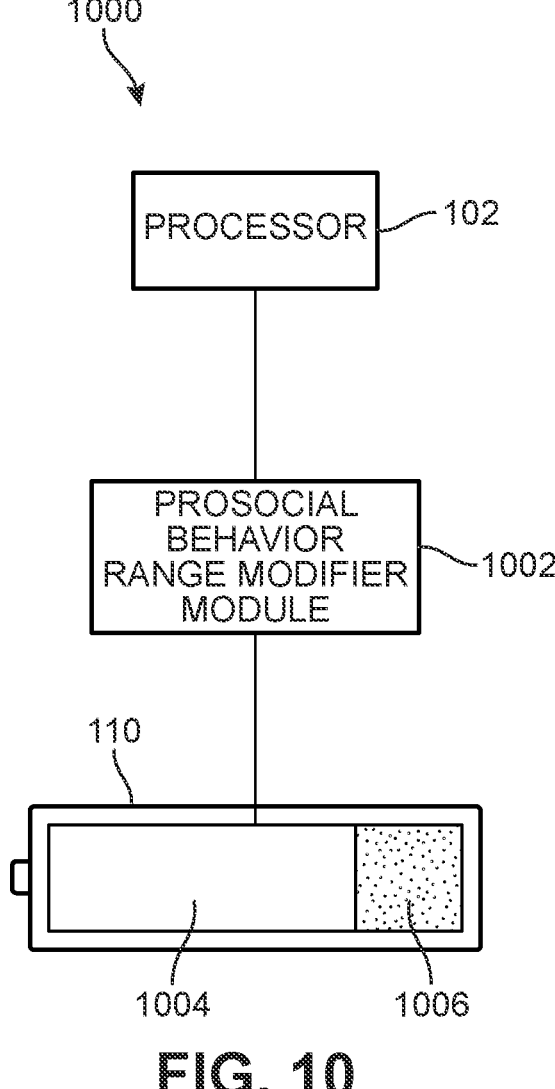
FIG. 10 is a schematic view of an example embodiment of a system for modifying range of a battery of a personal transport device based on prosocial behavior in accordance with aspects of the present disclosure.

Referring now to FIG. 10, a schematic view of an example embodiment of a system 1000 for modifying range of a battery of a personal transport device based on prosocial behavior is shown. In an example embodiment, system 1000 may be implemented by processor 102 of personal transport device 100 (shown in FIG. 1) and/or a processor of user device 130 (also shown in FIG. 1). In this embodiment, system 1000 includes a prosocial behavior range modifier module 1002 that controls access to additional electric power stored in battery 110 of personal transport device 100 based on detected or calculated prosocial behavior parameters.

In an example embodiment, battery 110 may include a main power portion 1004 and a power reserve portion 1006. Main power portion 1004 of battery 110 is the default amount of electric power available to electric motor 108 of personal transport device 100 for turning wheels 112. The predetermined range of personal transport device 100 is based on a size and capacity of battery 110. Typically, the capacity of an electric battery is measured in Ampere hours (Ah) and a battery having a larger capacity (e.g., higher number of Ah) will provide a longer range. In this embodiment, main power portion 1004 of battery 110 provides a first amount of capacity to personal transport device 100 that is associated with a predetermined range (i.e., how far personal transport device 100 may generally travel based on capacity of battery 110).

In this embodiment, battery 110 also includes power reserve portion 1006 that provides a second amount of capacity to personal transport device 100 to provide additional or supplemental range. For example, in one embodiment, the first capacity of main power portion 1004 of battery 110 may be approximately 30 Ah and the second capacity of power reserve portion 1006 may be 10 Ah. That is, the total, unrestricted capacity of battery 110 may be 40 Ah apportioned so that the first amount of capacity of main power portion 1004 represents 75% of the total capacity and the second amount of capacity of power reserve portion 1006 represents the remaining 25% of the total capacity. It should be understood that the values of capacity and associated relative percentages are exemplary and other values and percentages may be used in accordance with aspects of the present embodiments described herein.

In an example embodiment, prosocial behavior range modifier module 1002 may control access to power reserve portion 1006 of battery 110 to provide additional capacity to a user of personal transport device 100 based on their prosocial behavior. Functions of prosocial behavior range modifier module 1002 may be executed by software, hardware, or a combination of software and hardware, including operations implemented by processor 102 and/or a processor of user device 130. With this arrangement, prosocial behavior range modifier module 1002 may allow access to all or a part of power reserve portion 1006 of battery 110 to extend the predetermined range or actual range of personal transport device 100 in response to positive or acceptable prosocial behavior and may withhold or deny access to power reserve portion 1006 of battery 110 in response to negative or unacceptable prosocial behavior.

Figures 11A, 11B, 11C:
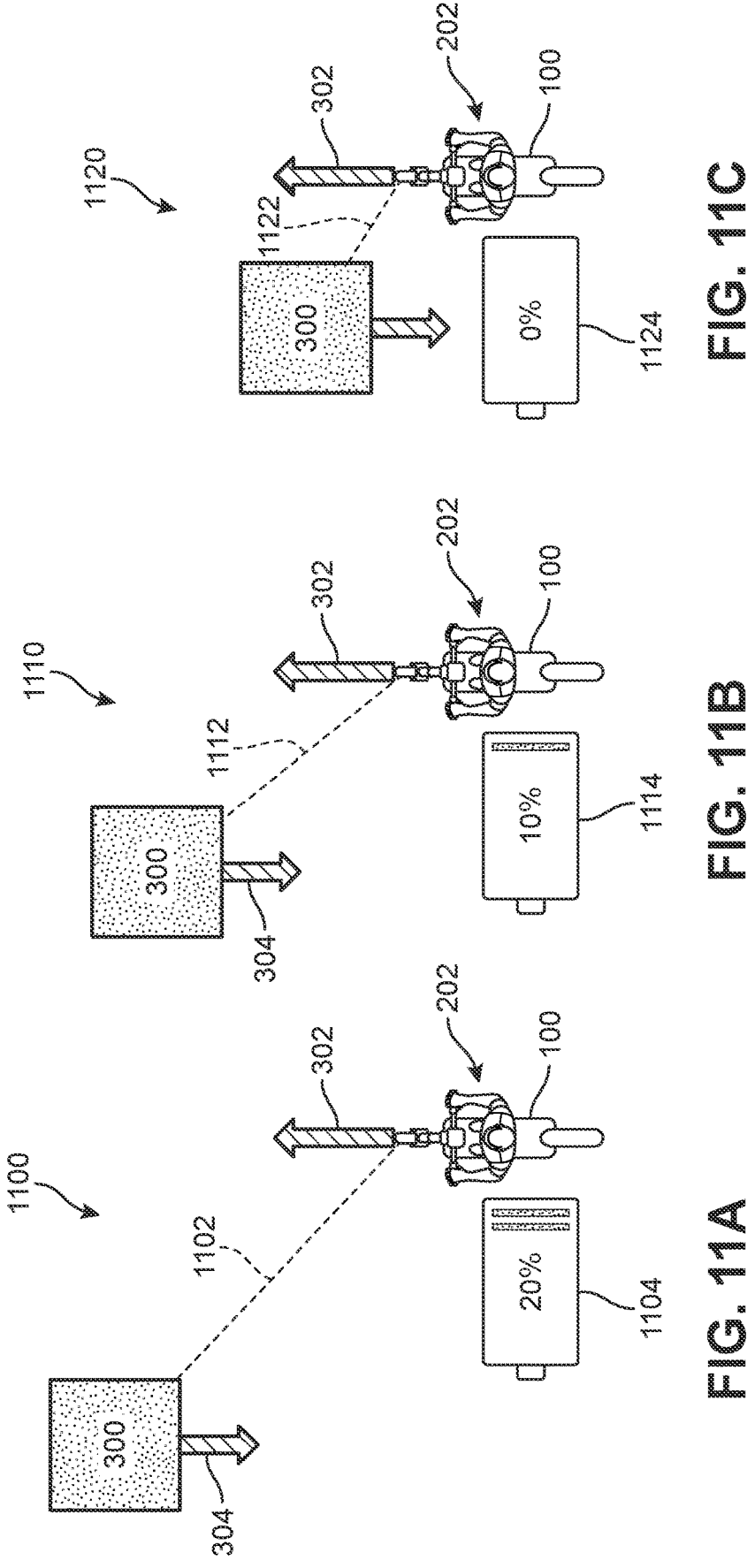
FIG. 11A is a representative view of a first type of range modification for a battery of a personal transport device based on prosocial behavior in accordance with aspects of the present disclosure.
FIG. 11B is a representative view of a second type of range modification for a battery of a personal transport device based on prosocial behavior in accordance with aspects of the present disclosure.
FIG. 11C is a representative view of a third type of range modification for a battery of a personal transport device based on prosocial behavior in accordance with aspects of the present disclosure.

FIG. 11A is a representative view of a first type of range modification 1100 for a battery of personal transport device 100 based on prosocial behavior. In this embodiment, personal transport device 100 is operated by user 202 on the same path (e.g., path 204 shown in FIG. 2) as object 300, as shown in FIG. 3. Personal transport device 100 is associated with first speed 302 and object 300 is associated with second speed 304, as also described above. In this embodiment, separation distance 1102 between personal transport device 100 and object 300 is large such that the calculated prosocial yielding behavior parameter is high. That is, the prosocial yielding behavior shown in FIG. 11A may be considered generally positive. As a result, range modification 1100 for battery 110 of personal transport device 100 is provided by allowing access to a first reserve capacity 1104 (e.g., 20% additional capacity) of battery 110.

For example, as shown in FIG. 10, first reserve capacity 1104 may be provided by prosocial behavior range modifier module 1002 allowing access to part of power reserve portion 1006 of battery 110 to provide first reserve capacity 1104 (e.g., 20% additional capacity) to user 202 of personal transport device 100 based on their positive prosocial behavior, as determined by the calculated prosocial yielding behavior parameter.

Referring now to FIG. 11B, a representative view of a second type of range modification 1110 for a battery of personal transport device 100 based on prosocial behavior is shown. In this embodiment, personal transport device 100 is operated by user 202 on the same path (e.g., path 204 shown in FIG. 2) as object 300, as shown in FIG. 3. Personal transport device 100 is associated with first speed 302 and object 300 is associated with second speed 304, as also described above. In this embodiment, separation distance 1112 between personal transport device 100 and object 300 is smaller than separation distance 1102 as shown in FIG. 11A such that the calculated prosocial yielding behavior parameter is lower than the calculated prosocial yielding behavior parameter shown in FIG. 11A. That is, the prosocial yielding behavior shown in FIG. 11B may be considered acceptable, but is indicative of a less positive prosocial behavior than the prosocial yielding behavior shown in FIG. 11A. As a result, range modification 1110 for battery 110 of personal transport device 100 is provided by allowing access to a second reserve capacity 1114 (e.g., 10% additional capacity) of battery 110.

For example, as shown in FIG. 10, second reserve capacity 1114 may be provided by prosocial behavior range modifier module 1002 allowing access to part of power reserve portion 1006 of battery 110 to provide second reserve capacity 1114 (e.g., 10% additional capacity) to user 202 of personal transport device 100 based on their acceptable prosocial behavior, as determined by the calculated prosocial yielding behavior parameter. In this embodiment, because the prosocial yielding behavior shown in FIG. 11B is acceptable, but not positive as shown in FIG. 11A, the resulting additional capacity allowed by prosocial behavior range modifier module 1002 (e.g., second reserve capacity 1114) is less than first reserve capacity 1104.

Referring now to FIG. 11C, a representative view of a third type of range modification 1120 for a battery of personal transport device 100 based on prosocial behavior is shown. In this embodiment, personal transport device 100 is operated by user 202 on the same path (e.g., path 204 shown in FIG. 2) as object 300, as shown in FIG. 3. Personal transport device 100 is associated with first speed 302 and object 300 is associated with second speed 304, as also described above. In this embodiment, separation distance 1122 between personal transport device 100 and object 300 is much smaller than separation distance 1102 shown in FIG. 11A and separation distance 1112 as shown in FIG. 11B. Accordingly, the calculated prosocial yielding behavior parameter for is lower than both the calculated prosocial yielding behavior parameters associated with the prosocial yielding behaviors shown in FIGS. 11A and 11B. That is, the prosocial yielding behavior shown in FIG. 11C may be considered not acceptable and indicative of a negative prosocial behavior. In this case, separation distance 1122 is too close to object 300 so as to cause discomfort or unease to another person or, in the case of an autonomous vehicle, to trigger or cause an accident avoidance response or reaction.

As a result, range modification 1120 for battery 110 of personal transport device 100 is not implemented such that no additional capacity 1124 (e.g., 0% additional capacity) is provide to battery 110. That is, prosocial behavior range modifier module 1002 withholds or denies access to any part of power reserve portion 1006 of battery 110 in response to negative or unacceptable prosocial behavior. With this arrangement, users engaging in positive or acceptable prosocial behavior are provided with additional range and users exhibiting negative or unacceptable prosocial behavior do not receive any additional range for personal transport device 100.

Figure 12:
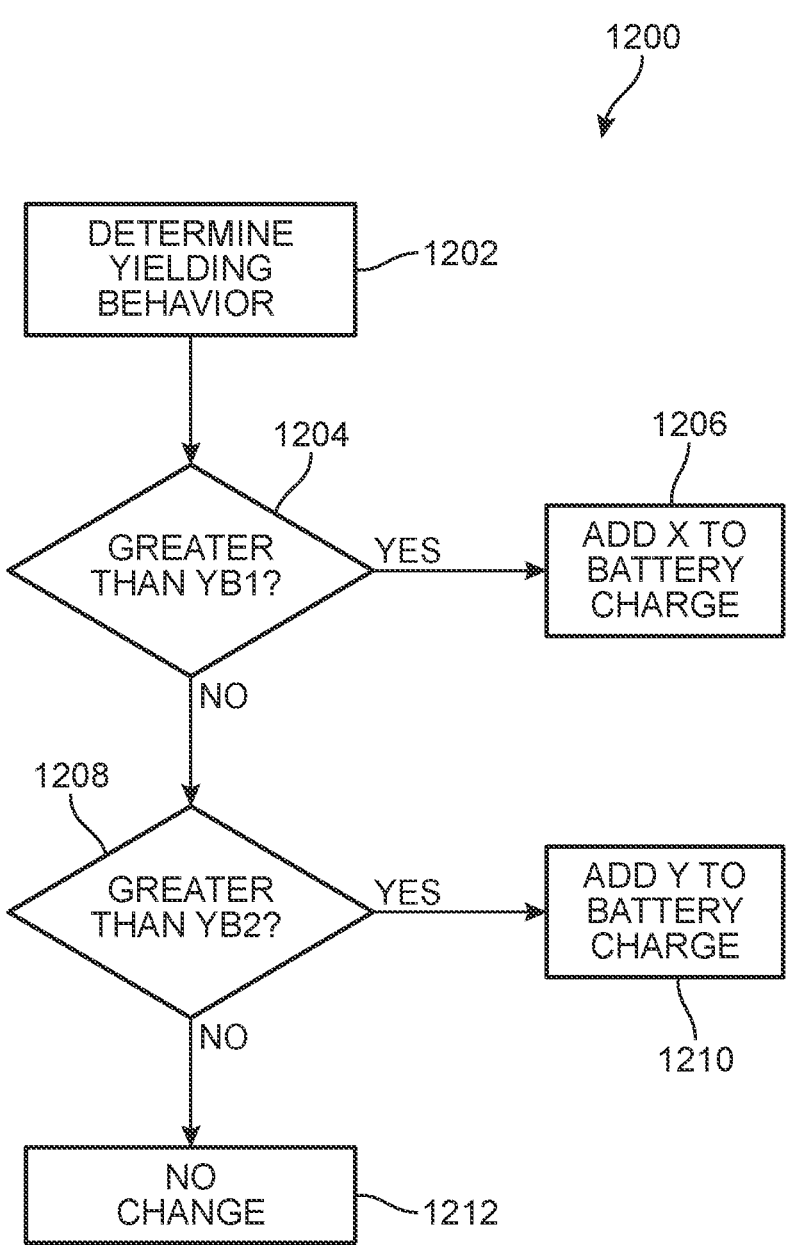
FIG. 12 is a flowchart of an exemplary method for modifying range of a battery of a personal transport device based on prosocial behavior in accordance with aspects of the present disclosure.

FIG. 12 is a flowchart of an exemplary method 1200 for modifying range of battery 110 of personal transport device 100 based on prosocial behavior. In some embodiments, operations of method 1200 may be implemented by prosocial behavior range modifier module 1002, processor 102 of personal transport device 100, a processor of user device 130, or by combination thereof. In an example embodiment, method 1200 may be begin at an operation 1202. In an example embodiment, operation 1202 of method 1200 may begin upon detection of an object in the path of personal transport device 100. At operation 1202, a prosocial yielding behavior parameter of personal transport device 100 is calculated. For example, at operation 1202, the calculated prosocial yielding behavior parameter may be calculated using the parameters described above, for example, based on information received from one or more cameras and sensors of personal transport device 100 and/or user device 130 (as shown in FIG. 1).

Next, method 1200 may proceed to an operation 1204. At operation 1204, the calculated prosocial yielding behavior parameter from operation 1202 may be compared with a first predetermined threshold value for the yielding behavior (i.e., YB1). When the result of the comparison at operation 1204 is that the calculated prosocial yielding behavior parameter is greater than the first predetermined threshold value YB1 (i.e., the result is YES), then method 1200 proceeds to an operation 1206. At operation 1206, prosocial behavior range modifier module 1002 allows access to a first predetermined amount of additional capacity (e.g., X) to battery 110. For example, at operation 1206, prosocial behavior range modifier module 1002 may allow access to part of power reserve portion 1006 of battery 110 to provide first reserve capacity 1104 (e.g., 20% additional capacity), as described above in reference to FIG. 11A.

When the result of the comparison at operation 1204 is that the calculated prosocial yielding behavior parameter is not greater than the first predetermined threshold value YB1 (i.e., the result is NO), then method 1200 proceeds to an operation 1208. At operation 1208, whether the calculated prosocial yielding behavior parameter is greater than a second predetermined threshold value for the yielding behavior (i.e., YB2) is determined. In an example embodiment, second predetermined threshold value YB2 is smaller than first predetermined threshold value YB1. For example, first predetermined threshold value YB1 may be associated with a positive prosocial behavior, such as first prosocial yielding behavior 400 shown in FIG. 4A and second predetermined threshold value YB2 may be associated with an acceptable prosocial behavior, such as second prosocial yielding behavior 410 shown in FIG. 4B.

When the result of the comparison at operation 1208 is that the calculated prosocial yielding behavior parameter is greater than the second predetermined threshold value YB2 (i.e., the result is YES), then method 1200 proceeds to an operation 1210. At operation 1210, prosocial behavior range modifier module 1002 allows access to a second predetermined amount of additional capacity (e.g., Y) to battery 110. For example, at operation 1210, prosocial behavior range modifier module 1002 may allow access to part of power reserve portion 1006 of battery 110 to provide second reserve capacity 1114 (e.g., 10% additional capacity), as described above in reference to FIG. 11B. In this embodiment, the second predetermined amount of additional capacity is less than the first predetermined amount of additional capacity (e.g., X>Y) to reflect that the prosocial yielding behavior of the user is merely acceptable (i.e., less positive) than the prosocial yielding behavior associated with operation 1206.

When the result of the comparison at operation 1208 is that the calculated prosocial yielding behavior parameter is not greater than the second predetermined threshold value YB2 (i.e., the result is NO), then method 1200 proceeds to an operation 1212. That is, the result of operation 1208 indicates that a user of personal transport device 100 is engaging in prosocial behavior that is not acceptable, such as third prosocial yielding behavior 420 shown in FIG. 4C. As a result of the determination, operation 1212 of method 1200 provides no change to the charge of battery 110. For example, at operation 1212, prosocial behavior range modifier module 1002 may withhold or deny access to any part of power reserve portion 1006 of battery 110 in response to negative or unacceptable prosocial behavior. With this arrangement, method 1200 encourages users engaging in positive or acceptable prosocial behavior with additional range and users exhibiting negative or unacceptable prosocial behavior do not receive any additional range for personal transport device 100.

In some cases, situations may arise where a user of personal transport device 100 who generally exhibits positive or acceptable prosocial behavior may not be able to reach their destination while continuing to engage in positive or acceptable prosocial behavior. For example, in some cases, prosocial behavior may cause a user of personal transport device 100 to operate at lower speeds, make more frequent stops to give way to persons or other objects in their path, and/or follow paths that are not the shortest distance in order to provide sufficient separation distances from persons or other objects in their path. Accordingly, in some embodiments, route guidance for a personal transport device (e.g., personal transport device 100) may modify the range of a battery by allowing the user to act in a more aggressive manner without regard for positive or acceptable prosocial behavior.

Figure 13:
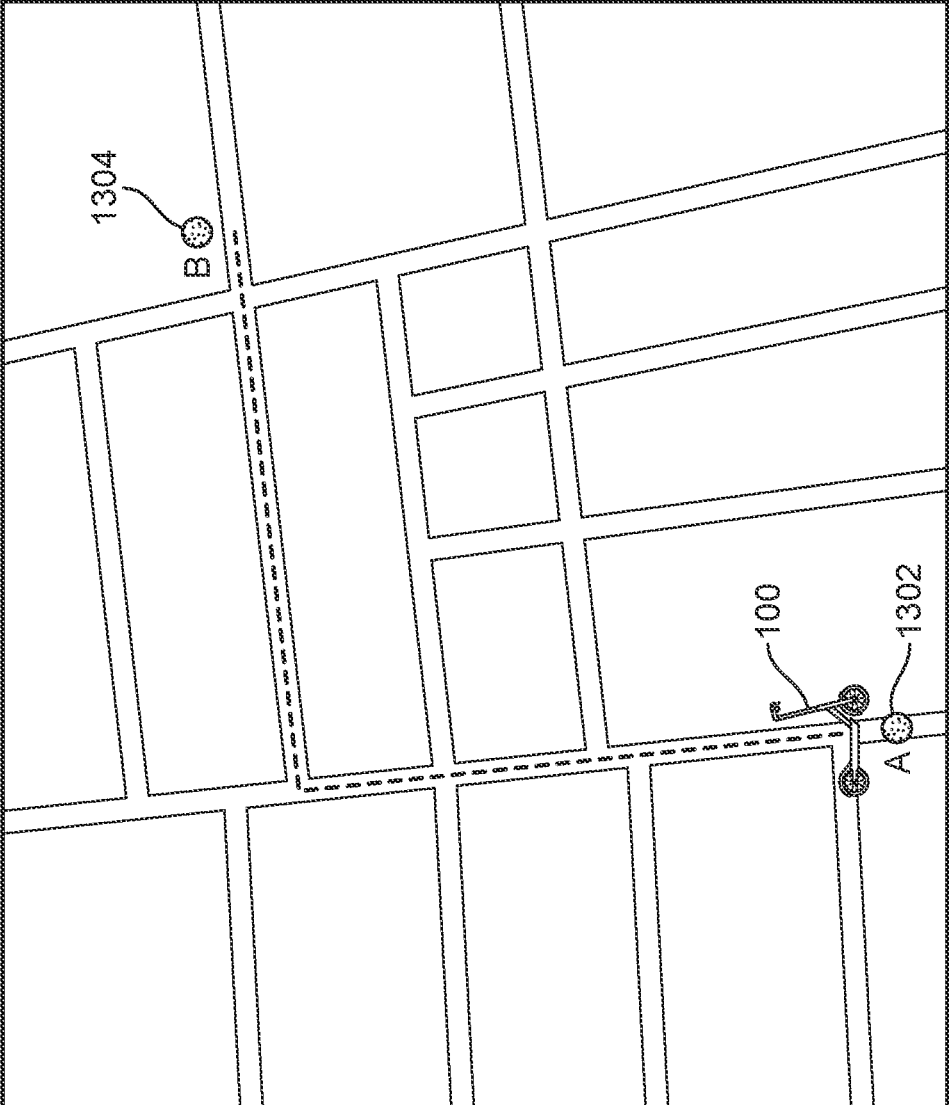
FIG. 13 is a representative view of an example embodiment of route guidance that modifies range of a battery of a personal transport device based on prosocial behavior in accordance with aspects of the present disclosure.

Referring now to FIG. 13, a representative view of an example embodiment of route guidance 1300 that modifies range of battery 110 of personal transport device 100 based on prosocial behavior. In this embodiment, route guidance 1300 determines a route from a first location 1302 (A) to a second location 1304 (B) for personal transport device 100. As shown on display 118 of personal transport device 100, battery 110 has a limited amount of remaining charge 1306 (e.g., 20% of battery 110 capacity) and the calculated route from first location 1302 to second location 1304 (e.g., route A→B) would require more than the amount of remaining charge 1306 in order to follow a prosocial route 1308 (e.g., requiring 23% of battery 110 capacity). That is, a user of personal transport device 100 traveling from first location 1302 (A) to second location 1304 (B) while engaging in positive or acceptable prosocial behavior will not have enough charge to reach second location 1304 (i.e., 23% for prosocial route 1308 is more than 20% of remaining charge 1306).

In this embodiment, personal transport device 100 may determine that in order for the user to reach second location 1304 (B) from first location 1302 (A), the user may be permitted or allowed to engage in more aggressive behavior (i.e., less positive prosocial behavior) so the remaining charge 1306 (e.g., 20% of battery 110 capacity) provides enough range to reach second location 1304. For example, in this embodiment, an aggressive route 1310 from first location 1302 to second location 1304 requires less than the amount of remaining charge 1306 to reach second location 1304 (e.g., 18% of battery capacity associated with aggressive route 1310 is less than the 20% of battery 110 capacity of remaining charge 1306).

In some embodiments, in these situations, personal transport device 100 may limit real-time feedback of prosocial behavior, described above, so that warnings or alerts are not provided to a user of personal transport device 100. Additionally, dynamic speed governing and/or input governing may also be relaxed or deactivated so that the user of personal transport device 100 may be able to reach second location 1304 using aggressive route 1310 without concern or regard for positive or acceptable prosocial behavior.

Figure 14:
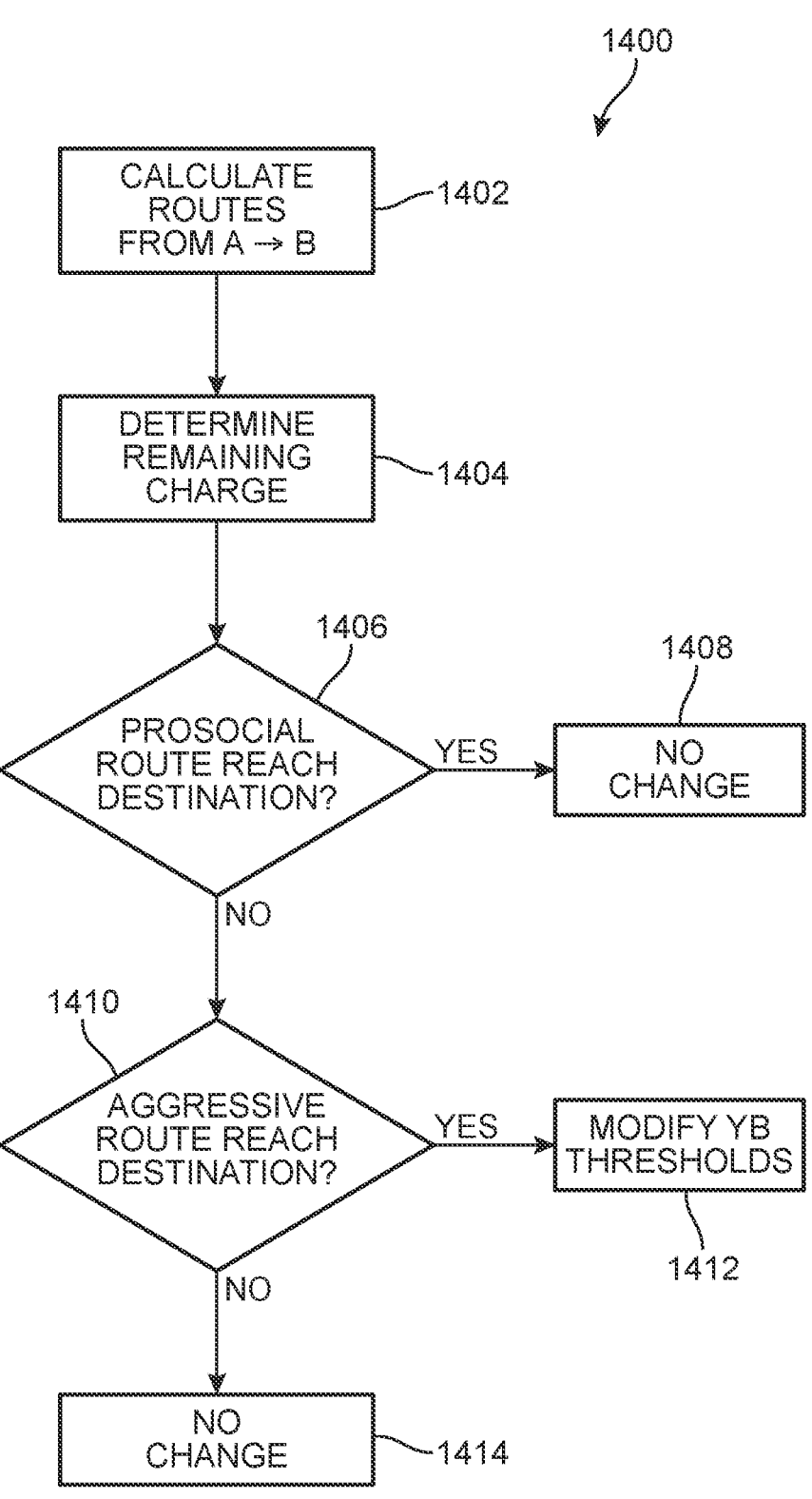
FIG. 14 is a flowchart of an exemplary method of route guidance that modifies range of a battery of a personal transport device based on prosocial behavior in accordance with aspects of the present disclosure.

Referring now to FIG. 14, a flowchart of an exemplary method 1400 of route guidance that modifies range of battery 110 of personal transport device 100 based on prosocial behavior is shown. In an example embodiment, method 1400 may be implemented by processor 102 and/or a processor of user device 130. In this embodiment, method 1400 begins at an operation 1402 where routes from first location 1302 (A) to second location 1304 (B) are calculated. At operation 1402, method 1400 may include calculating at least a prosocial route that takes into account positive or acceptable prosocial behavior by the user of personal transport device 100 and an aggressive route that does not take into account positive or acceptable prosocial behavior.

Next, method 1400 may proceed to an operation 1404 where an amount of remaining charge of battery 110 of personal transport device 100 is determined. As described above, battery charge and range (i.e., distance that may be traveling using the remaining charge) may be associated with each other using known relationships, which can be modified based on a variety of different factors. In some cases, operation 1404 may include using machine learning or AI techniques to improve the relationship between battery charge and range of personal transport device 100 to generate a more accurate determination of how far personal transport device can travel based on the amount of battery charge remaining.

Method 1400 proceeds to an operation 1406 where whether personal transport device 100 is able to reach its destination (e.g., second location 1304) following a prosocial route calculated at operation 1402 is determined. Upon determining at operation 1406 that personal transport device 100 is able to reach its destination following the prosocial route (i.e., the result of operation 1406 is YES), then method 1400 proceeds to an operation 1408 where no change is made.

Upon determining at operation 1406 that personal transport device 100 is not able to reach its destination following the prosocial route (i.e., the result of operation 1406 is NO), then method 1400 proceeds to an operation 1410. At operation 1410, whether personal transport device 100 is able to reach its destination (e.g., second location 1304) following an aggressive route calculated at operation 1402 is determined.

Upon determining at operation 1410 that personal transport device 100 is not able to reach its destination following the aggressive route (i.e., the result of operation 1410 is NO), then method 1400 proceeds to an operation 1414 where no change is made. That is, if the user will not be able to reach the destination even while not taking into account prosocial behavior, then no changes are made.

Upon determining at operation 1410 that personal transport device 100 is able to reach its destination following the aggressive route (i.e., the result of operation 1410 is YES), then method 1400 proceeds to an operation 1412 where the prosocial yielding behavior thresholds (e.g., YB1, YB2) are modified so that real-time feedback and/or dynamic speed or input governing based on prosocial behavior are relaxed or eliminated while personal transport device 100 is following the aggressive route.

With this arrangement, method 1400 allows users of personal transport device 100 the flexibility to engage in prosocial behavior that might otherwise be considered negative or unacceptable if they would not be able to reach their destination by engaging in positive or acceptable prosocial behavior. This feature ensures that users of personal transport devices are allowed to have relaxed enforcement of prosocial behaviors in order to reach their destinations.

In some embodiments, calculated route guidance for a personal transport device (e.g., personal transport device 100) may use prosocial behavior costs as part of the route determination process. For example, areas having a heavy pedestrian presence or that include a large number of other objects that may share the same path as the user of personal transport device 100 may require the user to operate personal transport device 100 at slower speeds, make more frequent stops, or to steer around the other objects on the path. As a result, these prosocial costs may make a route that would normally be shorter on the basis of distance alone actually take longer or be less efficient.

Figure 15:
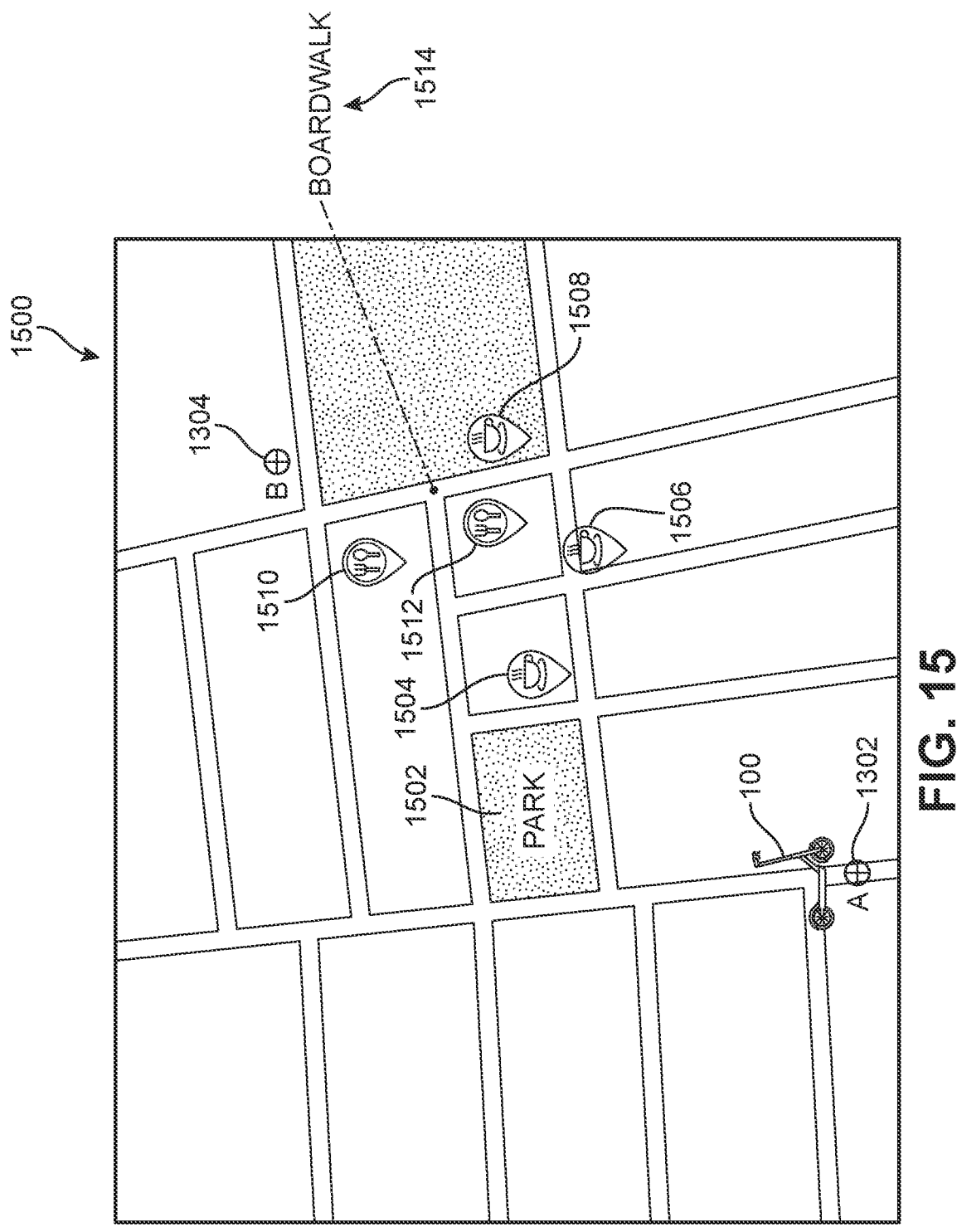
FIG. 15 is a representative view of an example embodiment of route guidance for a personal transport device that includes prosocial behavior costs in accordance with aspects of the present disclosure.

Referring now to FIG. 15, a representative view of an example mobility environment 1500 in which route guidance for personal transport device 100 that includes prosocial behavior costs is shown. In this embodiment, personal transport device 100 is at first location 1302 (A) and is traveling to second location 1304 (B). As shown in FIG. 15, mobility environment 1500 includes a number of areas that may impose additional prosocial costs for determining route guidance from first location 1302 (A) to second location 1304 (B). For example, in this embodiment, mobility environment 1500 includes a park 1502, a number of cafes, including a first café 1504, a second café 1506, and a third café 1508, as well as a number of restaurants, including a first restaurant 1510 and a second restaurant 1512. In this embodiment, mobility environment 1500 also includes a boardwalk 1514. Each of these areas, including park 1502, cafes 1504, 1506, 1508, restaurants 1510, 1512, and boardwalk 1514 may impose prosocial costs for route guidance within mobility environment 1500 because personal transport device 100 may need to operate at slower speeds, make frequent stops, and/or steer around many other objects that are in the path of personal transport device.

Figure 16:
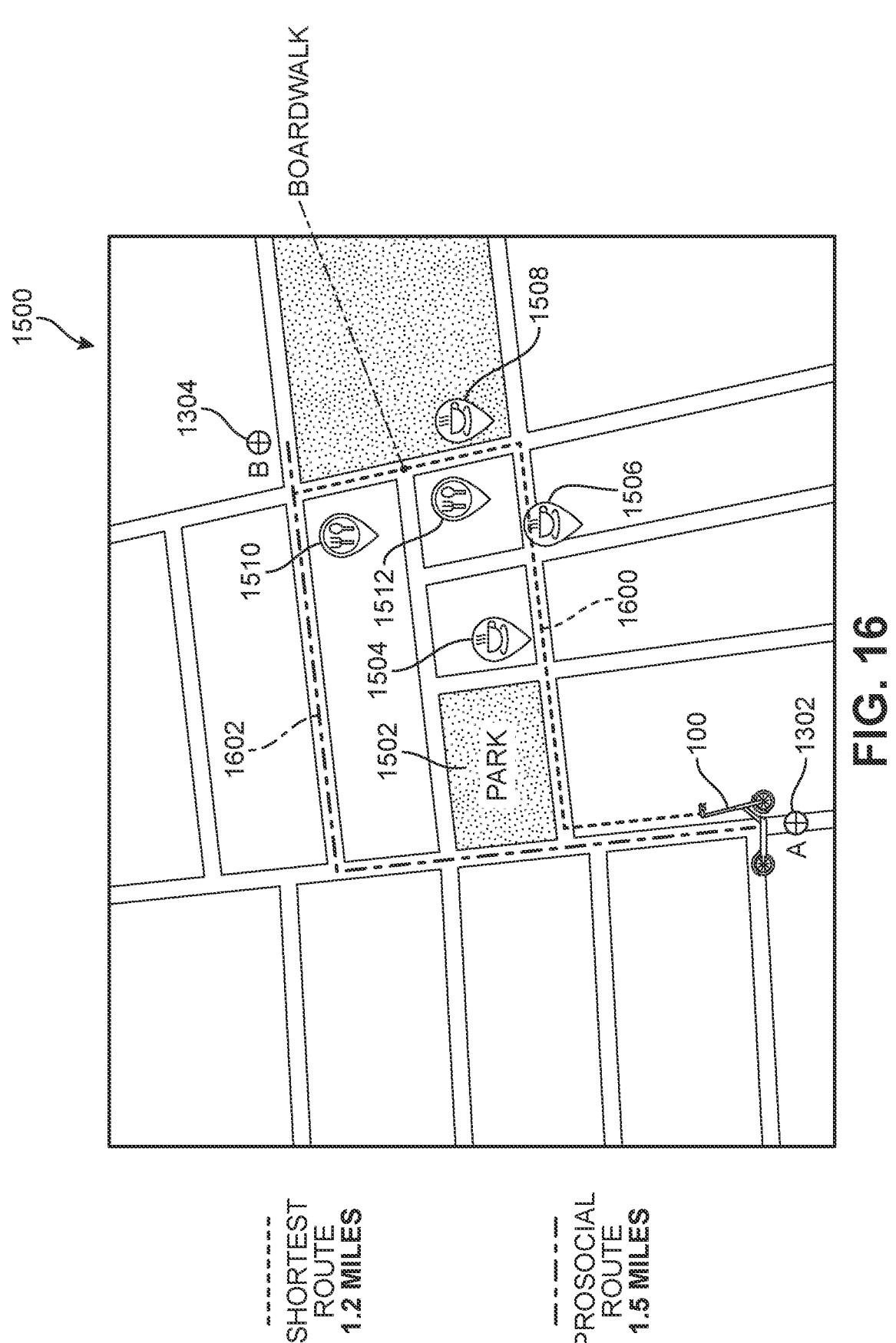
FIG. 16 is a representative view of an example embodiment of different routes determined for a personal transport device taking into account prosocial behavior costs in accordance with aspects of the present disclosure.

For example, referring now to FIG. 16, a shortest route 1600 from first location 1302 (A) to second location 1304 (B) passes park 1502, cafes 1504, 1506, 1508, restaurants 1510, 1512, and boardwalk 1514 on the way to second location 1304. As a result, while the actual distance (e.g., 1.2 miles) may represent the shortest distance from first location 1302 to second location 1304, there are significant prosocial costs associated with passing near high pedestrian traffic areas, such as park 1502, cafes 1504, 1506, 1508, restaurants 1510, 1512, and boardwalk 1514, due to the likely presence of many other objects, such as pedestrians and/or other objects.

In contrast, a prosocial route 1602 from first location 1302 (A) to second location 1304 (B) avoids cafes 1504, 1506, 1508, restaurant 1512, and boardwalk 1514 on the way to second location 1304. While prosocial route 1602 represents a longer distance (e.g., 1.5 miles compared to 1.2 miles for shortest route 1600), the prosocial costs associated with shortest route 1600 would impose additional time and/or battery range constraints to personal transport device 100. Accordingly, prosocial route 1602, which minimizes prosocial costs along the route, is a more efficient route from first location 1302 to second location 1304.

Additionally, in some embodiments, machine learning or AI techniques may be used to further refine route guidance in mobility environment 1500 to take into prosocial costs. For example, the machine learning or AI techniques may be used to recalculate the prosocial costs based on time-related factors, such as time of day (e.g., mornings, midday, evenings), day of the week (e.g., weekends versus weekdays), holidays, business operating times, etc. to determine when prosocial costs may be higher or lower than normal based on these time-related factors. With this arrangement, shortest route 1600 may be recommended when it is determined that the prosocial costs of such route are minimized or reduced because of the time-related factors.

For example, a user of personal transport device 100 seeking to travel from first location 1302 to second location 1304 late at night or early in the morning when other persons or objects are unlikely to be on the same path as personal transport device 100 may be able to travel along shortest route 1600 without any prosocial costs.

Figure 17:
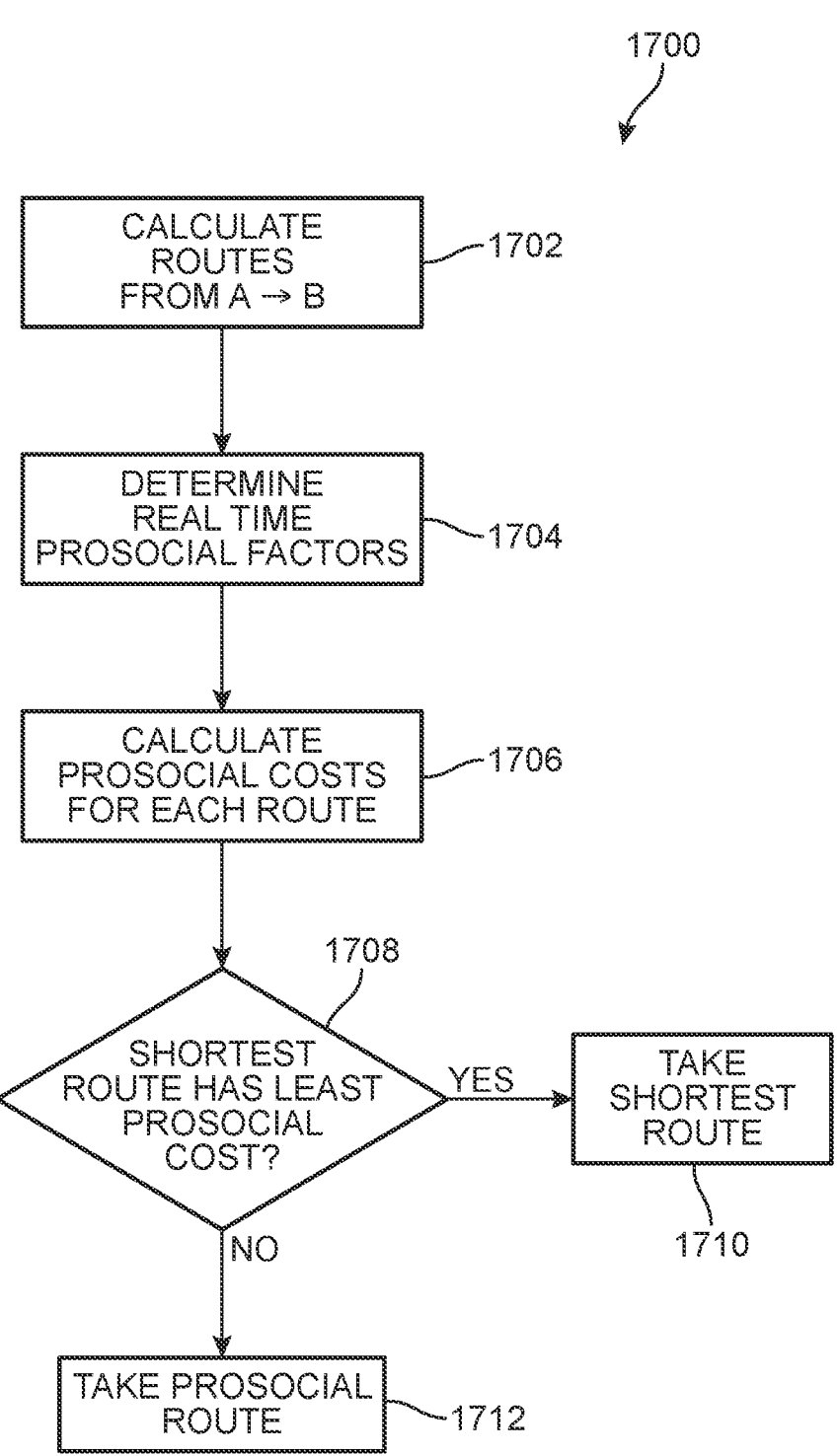
FIG. 17 is a flowchart of an exemplary method of route guidance for a personal transport device that includes prosocial behavior costs in accordance with aspects of the present disclosure.

Referring now to FIG. 17, a flowchart of an exemplary method 1700 of route guidance for personal transport device 100 that includes prosocial behavior costs is shown. In an example embodiment, method 1700 of route guidance taking into account prosocial costs may be implemented by processor 102 of personal transport device 100, a processor of user device 130, or by a combination of both. In this embodiment, method 1700 begins with an operation 1702 where routes from first location 1302 (A) to second location 1304 (B) are calculated. At operation 1702, method 1700 may include calculating different combinations of roads and/or paths from first location 1302 to second location 1304 using known route calculating algorithms.

Next, method 1700 includes an operation 1704 where one or more real-time prosocial factors are determined based on the routes calculated at operation 1702. For example, operation 1704 may include determining the presence or absence of high pedestrian traffic, such as one or more of park 1502, cafes 1504, 1506, 1508, restaurants 1510, 1512, and/or boardwalk 1514. Operation 1704 may also take into account time-based factors associated with the prosocial factors, as described above. Next, method 1700 proceeds to an operation 1706 where the prosocial costs associated with the real-time prosocial factors from operation 1704 are applied to each of the routes from first location 1302 to second location 1304 calculated at operation 1702.

Method 1700 may then proceed to an operation 1708. At operation 1708, whether the shortest route (e.g., by distance) calculated at operation 1702 has the least prosocial cost is determined. Upon determining at operation 1708 that the shortest route does have the least prosocial cost (i.e., the result of operation 1708 is YES), then method 1700 proceeds to an operation 1710 where method 1700 recommends that the user of personal transport device 100 take the shortest route (e.g., shortest route 1600 shown in FIG. 16).

Upon determining at operation 1708 that the shortest route does not have the least prosocial cost (i.e., the result of operation 1708 is NO), then method 1700 proceeds to an operation 1712 where method 1700 recommends that the user of personal transport device 100 take the prosocial route (e.g., prosocial route 1602 shown in FIG. 16) that minimizes the prosocial costs associated with traveling from first location 1302 to second location 1304. With this arrangement, method 1700 may provide route guidance that takes into account prosocial costs associated with a route to a destination to minimize the prosocial costs encountered by a user of personal transport device 100.

The techniques described herein provide for a method and system that allows a user of a personal transport device to receive real-time feedback based on detected or calculated prosocial behavior parameters. Additionally, dynamic speed governing and/or steering may be implemented to encourage or assist with realizing acceptable prosocial behaviors. Other types of incentives, such as extended battery range and prosocial cost-based routing may further help encourage users of personal transport devices to employ positive prosocial behavior towards others sharing common pathways within mobility environments.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A method for calculating route guidance for a personal transport device based on prosocial costs, the method comprising:

calculating, by a processor associated with the personal transport device, a plurality of routes from a first location to a second location;

determining, by the processor, one or more prosocial factors associated with each route of the plurality of routes;

calculating, by the processor, a prosocial cost associated with each route of the plurality of routes;

based on the prosocial costs, providing, by the processor, route guidance to a user of the personal transport device from the first location to the second location along a selected route from the plurality of routes;

displaying the selected route on a display associated with the personal transport device;

during travel along the selected route by the personal transport device, the method further comprises:

detecting, by at least one of a camera or a sensor associated with the personal transport device, at least one object located on the selected route;

detecting, using the camera and/or the sensor, a speed of the at least one object located on the selected route;

determining, by a GPS sensor associated with the personal transport device, a speed of the personal transport device;

calculating, by the processor associated with the personal transport device, a prosocial yielding behavior parameter associated with the at least one object and the personal transport device, wherein calculating the prosocial yielding behavior parameter by the processor comprises:

determining a separation distance between the at least one object and the personal transport device; and calculating the prosocial yielding behavior parameter as a function of the speed of the at least one object, the speed of the personal transport device, and the separation distance, wherein the prosocial yielding behavior parameter comprises: the separation distance between the at least one object and the personal transport device divided by a sum of the speed of the at least one object and the speed of the personal transport device;

comparing the calculated prosocial yielding behavior parameter to a threshold value; and based on the comparison of the calculated prosocial yielding behavior parameter to the threshold value, providing real-time feedback to the user of the personal transport device.

2. The method according to claim 1, wherein the method further comprises:

determining, by the processor, whether a route of the plurality of routes having a shortest distance from the first location to the second location has a lowest prosocial cost; and upon determining that the route having the shortest distance has the lowest prosocial cost, selecting, by the processor, the route having the shortest distance as the selected route.

3. The method according to claim 2, wherein, upon determining that the route having the shortest distance does not have the lowest prosocial cost, selecting, by the processor, a route of the plurality of routes having the lowest prosocial cost.

4. The method according to claim 1, wherein the one or more prosocial factors includes a presence of pedestrians along a portion of each route of the plurality of routes.

5. The method according to claim 1, wherein the one or more prosocial factors includes a presence of one or more cafes or restaurants along a portion of each route of the plurality of routes.

6. The method according to claim 1, wherein the one or more prosocial factors includes real-time prosocial factors associated with at least a portion of each route of the plurality of routes.

7. The method according to claim 6, wherein the real-time prosocial factors are determined using machine learning or artificial intelligence algorithms implemented by the processor.

8. The method according to claim 6, wherein the real-time prosocial factors are based on a time of day or day of week.

9. The method according to claim 1, wherein at least the processor, the display, and the camera are associated with a user device in communication with the personal transport device.

10. A system for calculating route guidance for a personal transport device based on prosocial costs comprising:

a personal transport device including a processor, at least one radar or lidar sensor, and two or more wheels;

a display associated with the personal transport device;

a camera associated with the personal transport device;

a GPS sensor associated with the personal transport device; and wherein the processor is configured to:

calculate a plurality of routes from a first location to a second location;

determine one or more prosocial factors associated with each route of the plurality of routes;

calculate a prosocial cost associated with each route of the plurality of routes;

based on the prosocial costs, provide route guidance to a user of the personal transport device from the first location to the second location along a selected route from the plurality of routes;

display the selected route on the display associated with the personal transport device; and wherein, during travel along the selected route by the personal transport device, the processor is further configured to:

detect at least one object located on the selected route using the camera;

determine a speed of the at least one object using the at least one radar or lidar sensor;

determine a separation distance between the at least one object and the personal transport device;

determine a speed of the personal transport device using the GPS sensor;

calculate a prosocial yielding behavior parameter associated with the at least one object and the personal transport device as a function of the speed of the at least one object, the speed of the personal transport device, and the separation distance between the object and the personal transport device, wherein the prosocial yielding behavior parameter comprises: the separation distance between the at least one object and the personal transport device divided by a sum of the speed of the at least one object and the speed of the personal transport device;

compare the calculated prosocial yielding behavior parameter to a first threshold value; and based on the comparison of the calculated prosocial yielding behavior parameter to the threshold value, provide real-time feedback to the user of the personal transport device.

11. The system according to claim 10, further comprising a communication interface disposed on the personal transport device, the communication interface being in communication with a user device; and wherein at least one of the camera and the display is associated with the user device.

12. The system according to claim 11, wherein the GPS sensor is disposed on the user device.

13. The system according to claim 10, wherein, upon determining that the route having the shortest distance does not have the lowest prosocial cost, the processor is further configured to select a route of the plurality of routes having the lowest prosocial cost.

14. The system according to claim 10, wherein the one or more prosocial factors includes a presence of pedestrians and/or one or more cafes or restaurants along a portion of each route of the plurality of routes.

15. The system according to claim 10, wherein the one or more prosocial factors includes real-time prosocial factors associated with at least a portion of each route of the plurality of routes.

16. The system according to claim 15, wherein the real-time prosocial factors are determined using machine learning or artificial intelligence algorithms implemented by the processor.

17. The system according to claim 15, wherein the real-time prosocial factors are based on a time of day or day of week.

18. The system according to claim 10, wherein the processor is further configured to limit the real-time feedback provided to the user of the personal transport device so that the user may reach the second location.

\* \* \* \* \*